(12) United States Patent
Ratti

(10) Patent No.: US 10,296,794 B2
(45) Date of Patent: May 21, 2019

(54) ON-DEMAND ARTIFICIAL INTELLIGENCE AND ROADWAY STEWARDSHIP SYSTEM

(71) Applicant: Jayant Ratti, Atlanta, GA (US)

(72) Inventor: Jayant Ratti, Atlanta, GA (US)

(73) Assignee: Jayant Rtti, Atlanta, GA (US)

( * ) Notice: Subject to any disclaimer, the term of this patent is extended or adjusted under 35 U.S.C. 154(b) by 0 days.

(21) Appl. No.: 15/919,033

(22) Filed: Mar. 12, 2018

(65) Prior Publication Data

US 2018/0211117 A1 Jul. 26, 2018

Related U.S. Application Data

(63) Continuation-in-part of application No. 15/689,350, filed on Aug. 29, 2017, now Pat. No. 9,916,755.

(Continued)

(51) Int. Cl.
*G06K 9/00* (2006.01)
*G08G 1/017* (2006.01)
(Continued)

(52) U.S. Cl.
CPC ......... *G06K 9/00785* (2013.01); *G06F 15/76* (2013.01); *G06K 9/3233* (2013.01);
(Continued)

(58) Field of Classification Search
CPC ....... G06F 3/005; G06F 3/017; H04N 5/4403; H04N 5/23238; G06K 9/00785;
(Continued)

(56) References Cited

U.S. PATENT DOCUMENTS 6,546,119 B2 4/2003 Ciolli et al.
6,560,529 B1 5/2003 Janssen
(Continued)

FOREIGN PATENT DOCUMENTS

CN 101183427 A 5/2008
CN 104200668 A 12/2014
(Continued)

*Primary Examiner* — Hoi C Lau

(57) ABSTRACT

The present disclosure relates to artificial intelligence based systems and method for determination of traffic violations. The present disclosure provides systems and methods that use deep convolutional neural networks and machine vision based algorithms to perform a task of detection and recognition to provide complete solution to safe, legal and comfortable parking, driving and riding for commuters on the roadways. Roadway stewardship systems, Parking management systems when made on-demand and crowdsourced, can play a very strong role in regulating driving conditions in cities and highways. By allowing the on-demand, crowdsourced, roadway stewardship system to be automated, through the use of Artificial Intelligence (AI) sub-systems, users can be trained to recognize and be educated as well in the laws & regulations around the use of roadways; can help the process through an interactive console/game-play, which can also be used for monetization for individuals to earn money for their contribution. The AI assisted with Human Intelligence (HI) together called HAI in particular, can play a valuable role in reducing traffic density, traffic movement restrictions and fuel and time waste in large cities. Also proper driving on the roads can lead to faster and safer commute. In Addition, multiple other objects of interest can also be identified and trained to be recognized using the Stewardship System disclosed herein.

17 Claims, 21 Drawing Sheets

Related U.S. Application Data

(60) Provisional application No. 62/437,007, filed on Dec. 20, 2016.

(51) Int. Cl.
*G08G 1/054* (2006.01)
*G06K 9/32* (2006.01)
*G08G 1/14* (2006.01)
*G06Q 50/26* (2012.01)
*G06N 3/02* (2006.01)
*G06N 20/00* (2019.01)
*G06K 9/62* (2006.01)
*G06F 15/76* (2006.01)

(52) U.S. Cl.
CPC ......... *G06K 9/3241* (2013.01); *G06K 9/6267* (2013.01); *G06N 3/02* (2013.01); *G06N 20/00* (2019.01); *G06Q 50/26* (2013.01); *G08G 1/0175* (2013.01); *G08G 1/054* (2013.01); *G08G 1/141* (2013.01)

(58) Field of Classification Search
CPC .. G06K 9/007; G06K 9/00771; G06K 9/6267; G06K 9/00812; G06K 9/00624; G06K 9/00711; G06K 9/00818; G06K 9/66; G08G 1/012; G08G 1/0112; G08G 1/0175; G06N 99/005; G06Q 30/0207
See application file for complete search history.

(56) References Cited

U.S. PATENT DOCUMENTS

| | | | |
|---|---|---|---|
| 7,363,133 B2 | 4/2008 | Maurer et al. | |
| 7,720,580 B2 | 5/2010 | Higgins-Luthman | |
| 8,041,080 B2* | 10/2011 | Porikli | G06K 9/00818 340/905 |
| 8,184,863 B2 | 5/2012 | Wang | |
| 8,446,467 B2 | 5/2013 | Tilton et al. | |
| 8,509,486 B2 | 8/2013 | Hsieh et al. | |
| 8,587,649 B2 | 11/2013 | Lo et al. | |
| 8,983,136 B2 | 3/2015 | Liu et al. | |
| 9,286,524 B1 | 3/2016 | Mei et al. | |
| 9,305,223 B1 | 4/2016 | Ogale et al. | |
| 9,317,752 B2* | 4/2016 | Bulan | G06K 9/00771 |
| 9,428,192 B2 | 8/2016 | Schofield et al. | |
| 9,477,892 B2* | 10/2016 | Wu | G06K 9/00785 |
| 9,704,060 B2 | 7/2017 | Wang et al. | |
| 9,760,806 B1 | 9/2017 | Ning et al. | |
| 9,779,314 B1 | 10/2017 | Wendel et al. | |
| 9,779,331 B2* | 10/2017 | Bulan | G06K 9/66 |
| 9,916,755 B1* | 3/2018 | Ratti | H04W 4/029 |
| 2009/0273711 A1* | 11/2009 | Chapdelaine | G06K 9/00711 348/465 |
| 2011/0109476 A1* | 5/2011 | Porikli | G06K 9/00818 340/905 |
| 2012/0148105 A1 | 6/2012 | Burry et al. | |
| 2013/0049988 A1 | 2/2013 | Roeber et al. | |
| 2013/0311075 A1 | 11/2013 | Tran et al. | |
| 2014/0376769 A1* | 12/2014 | Bulan | G06K 9/00771 382/103 |
| 2015/0235091 A1 | 8/2015 | Kumano et al. | |
| 2015/0278609 A1* | 10/2015 | Wu | G06K 9/00785 382/104 |
| 2015/0279021 A1* | 10/2015 | Wu | G06T 3/40 382/103 |
| 2015/0310274 A1* | 10/2015 | Shreve | G06K 9/00624 382/103 |
| 2015/0310624 A1* | 10/2015 | Bulan | G06K 9/66 382/103 |
| 2016/0148058 A1* | 5/2016 | Bulan | G06K 9/6267 382/103 |
| 2016/0293002 A1 | 10/2016 | Ekin | |
| 2017/0017848 A1 | 1/2017 | Gupta et al. | |
| 2017/0024619 A1* | 1/2017 | Wu | G06K 9/00812 |
| 2017/0124409 A1* | 5/2017 | Choi | G06N 3/0454 |
| 2017/0217442 A1* | 8/2017 | Rios, III | B60W 50/00 |
| 2017/0300763 A1 | 10/2017 | Zou et al. | |
| 2017/0372161 A1 | 12/2017 | Almeida et al. | |
| 2018/0165548 A1* | 6/2018 | Wang | G06T 7/246 |
| 2018/0211117 A1* | 7/2018 | Ratti | G06K 9/00785 |

FOREIGN PATENT DOCUMENTS

| | | |
|---|---|---|
| CN | 104298976 A | 1/2015 |
| CN | 105975929 A | 9/2016 |
| CN | 106022300 A | 10/2016 |
| CN | 106250892 A | 12/2016 |
| CN | 106295551 A | 1/2017 |
| CN | 106327878 A | 1/2017 |
| CN | 106372662 A | 2/2017 |
| CN | 106373426 A | 2/2017 |
| CN | 106408000 A | 2/2017 |
| CN | 106652465 A | 5/2017 |
| CN | 106845430 A | 6/2017 |

* cited by examiner

ON-DEMAND ARTIFICIAL INTELLIGENCE AND ROADWAY STEWARDSHIP SYSTEM

CROSS-REFERENCE TO RELATED APPLICATION

This application claims the benefit of the following co-pending patent application which is incorporated herein by reference in its entirety: application Ser. No. 15/689,350 filed on Aug. 29, 2017 and entitled "On-demand Roadway Stewardship System", which claims priority from provisional patent application Ser. No. 62/437,007, filed on Dec. 20, 2016.

FIELD OF DISCLOSURE

The present disclosure relates to crowd-sourced artificial intelligence (AI) and more specifically relates to an artificial intelligence based system and method for determination of traffic violations and objects of visual interest with data obtained from people.

BACKGROUND

The background description includes information that may be useful in understanding the present invention. It is not an admission that any of the information provided herein is prior art or relevant to the presently claimed invention, or that any publication specifically or implicitly referenced is prior art.

Parking spaces are frequently in short supply and high in demand. Accordingly, cities and towns will often provide metered parking spaces and handicapped parking spaces. Handicapped spaces are designated only for authorized handicapped persons. The parking meters accept coins or dollar bills in return for time on the meter, which represents the amount of authorized time that the vehicle may remain within the parking space. If the vehicle remains within the parking space after the meter expires, the owner of the parked vehicle is subject to citation or towing. Alternatively, in many other parts of the city, the parking garages/parking lots would provide a sheltered or open aired parking space. Sometimes these are multi-level garages, to support multiple cars. In an exemplary sub-set the parking lot is claimed by the authorities at a space for the convenience of the public and parking attendants are commissioned/enstated to facilitate parking for shoppers, show owners, visitors etc. In residential and business establishment, the location within the driveway or underground/basement levels and the sidewalk location adjoining the establishment are granted to allow for parking.

Private parking spaces are also available in areas where parking is in short supply. These parking spaces typically come at some expense to the vehicle owner, but usually offer the convenience of not requiring that the owner pay money throughout the day. Moreover, private parking spaces often offer greater security and a convenient location. Many private garages issue a fixed number of monthly parking passes sometimes costing $200.00-$300.00 or more. Unfortunately, unauthorized persons often park in the assigned spaces resulting in significant inconvenience to both the owner of the private parking lot and the owner of the vehicle which is entitled to the parking space. In order to reduce the unauthorized parking within the assigned spaces, the parking lot owners will often employ expensive attendants to monitor the parking lot.

The standard practice of issuing parking violations involves the use of officials, commonly referred to as "meter-maids". These officials scour the streets in search of violators. Once a violation is located, the official exits their vehicle, if not traveling on foot, and records important vehicle information. The officer then writes out a written acknowledgment of the violation, referred to as a parking citation or ticket. Unfortunately, this process requires considerable time to search for and record violations. This time is costly and could be more productively used. In addition, parking violation officials frequently find numerous vehicles which are simultaneously violating parking laws. While the official is preparing one written citation, owners of other vehicles exit the scene before a violation can be issued. This also results in loss of money to the city and ability for risk taking by defaulters, knowledgeable of their ability to "get-away". In other cases, the parking enforcement car drives around the neighborhood and determines if a parking spot is empty or occupied and then the information fed to the central server from the parking pay stations about the expiration of parking times for various spots.

A paper titled "License Plate Detection and Recognition Using Deeply Learned Convolutional Neural Networks" by Syed Zain Masood, et al, proposes a sighthound's fully automated license no. plate detection and recognition system. The core technology of the system is built using a sequence of deep Convolutional Neural Networks interlaced with accurate and efficient algorithms.

A paper titled "Real-Time Illegal Parking Detection System Based on Deep Learning" by Xuemei Xie et al, proposes a novel illegal vehicle parking detection system. Illegal vehicles captured by camera are firstly located and classified by the famous Single Shot Multi-Box Detector (SSD) algorithm. After that, a tracking and analysis of movement is adopted to judge the illegal vehicles in the region of interest.

United States Patent Publication 20170017848A1 filed by Magna Electronics Inc. teaches a parking assist system of a vehicle that includes a camera that, when disposed at the vehicle, has a field of view exterior of the vehicle. An image processor is operable to process image data captured by the camera to detect parking space markers indicative of a parking space and to identify empty or available parking spaces.

Indian Patent Publication 201711020147A filed by HCL Technologies Limited teaches a driver of an automobile for parking the automobile. The system may detect multiple parameters associated with an automobile, and preferences associated with the driver and allocate a parking by generating a parking token corresponding to the parking slot and provide a first set of navigation instruction and orientation instructions for guiding the driver to reach the parking slot based on monitoring of the parking token.

There are other violations that have been determined for drivers of vehicles for example, not wearing helmets, which is a hazard for bike/scooter riders and is considered unlawful by many, speeding is another most dangerous violation on the roads and many cities impose heavy penalties including revocation of license to drive and other civil actions against drivers over speeding or abetting over speeding. Also, road lanes are made and demarcated for drivers to maintain their lanes while driving for safe commuting and safe maneuvering across lanes, merging into traffic, overtaking etc. lane departure without notification is a serious jeopardy to other motorists and creates aggressive responses from others who are following the lanes, due to the dangers involved in such type of driving. Further, jumping red lights or stop signs are considered very severe violations of traffic, posing risk of life and property for everyone within reach of the violation area. Further, other multiple violations are also important to record and cause grave harm to people and property. Examples of some available prior-art literature are as listed below:

A paper titled "a system for tracking and annotating illegally parked vehicles, by Vrusias et. al., presents an automatic method for identifying such events in CCTV video, by first tracking all the related objects and then annotating the events with appropriate keywords for storing and retrieval purposes. The method proposed makes use of a combination of video object tracking algorithms and techniques for capturing knowledge in keyword-based ontology structures. Starting from low level visual information extracted from each video frame, high-level semantics such as moving objects are identified and classified. A probabilistic model, which takes its inputs from the visual modules, is used for identifying illegally parked vehicles. Finally, the keyword ontology, constructed automatically from expert descriptions, is linked to objects identified in the video.

A paper titled "Police Eyes" (DOI: 10.11.09/ECTI-Con.2013.6559635, Print ISBN: 978-1-4799-0546-1, Publisher: IEEE, Conference Location: Krabi, Thailand) describes a mobile, real-time traffic surveillance system we have developed to enable automatic detection of traffic violations. Police Eyes would be useful to police for enforcing traffic laws and would also increase compliance with traffic laws even in the absence of police. The system detects illegal crossings of solid lines using image processing and efficient computer vision techniques on image sequences acquired from static IP cameras.

Chinese Patent application CN101183427A by Chengjun is system that checks the violation of illegal parking by monitoring a parking region continuously from a video stream acquired by an omnidirectional sensor. When a vehicle enters the monitored region, the system starts an event which comprises of tracking the vehicle using a multi-object tracker, license plate recognition using background subtraction and template matching. This patent doesn't employ any Deep learning methods.

A paper titled "Signal Jump Detection Process" (International Journal of Computer Applications Technology and Research, Volume 6—Issue 2, 101-105, 2017, ISSN:-2319-8656), provides a system employing image processing techniques namely edge detection and image segmentation in order to detect and recognize the number plate of the vehicle which jumps a red light at a traffic signal.

A paper titled "Integrating motion and appearance for overtaking vehicle detection (Published in: Intelligent Vehicles Symposium Proceedings", 2014 IEEE, DOI: 10.1109/IVS.2014.6856598,), proposes an algorithm for detecting overtaking vehicles using motion cues from the scene. Motion compensation of video data is performed using the optical flow of the scene and epipolar geometry. After post processing and outlier removal, overtaking vehicle candidates are produced.

A paper titled "Overtaking vehicle detection using a spatio-temporal CRF" (Published in: Intelligent Vehicles Symposium Proceedings, 2014 IEEE, DOI: 10.1109/IVS.2014.6856546), provides a novel CRF model to make use of the interaction between local regions, and the motion features from multiple scales as well. The whole model is based on the low-level optical flows.

A paper by Zhu, et al., titled "Traffic-sign detection and classification in the wild", in Proceedings of the IEEE Conference on Computer Vision and Pattern Recognition (pp. 2110-2118), provides promising results that have been achieved in the areas of traffic-sign detection and classification U.S. Pat. No. 6,546,119B2, "Automated traffic violation monitoring and reporting system" by Redflex Traffic Systems provides a system for monitoring and reporting incidences of traffic violations at a traffic location is disclosed. The system comprises a digital camera system deployed at a traffic location. The camera system is remotely coupled to a data processing system. The mounted camera system is used for traffic light violation detection. For the task of red light violation the intersection camera system is strategically placed at an intersection to monitor and record incidences of drivers disobeying a red light. When a vehicle is detected approaching the stop line of a monitored lane, it is tracked and its speed is calculated. If the vehicle is detected entering the intersection against the traffic signal, an evidentiary image set is captured.

A paper by Huang, Shih-Shinh, et al. titled "On-board vision system for lane recognition and front-vehicle detection to enhance driver's awareness, Robotics and Automation, 2004 Proceedings ICRA'04 2004 IEEE International Conference on. Vol. 3. IEEE, 2004, provides a detecting and warning system which is able to pick up the information about two most familiar on-road objects: lane and vehicle.

A paper by Gurghian, et. al., titled "DeepLanes: End-To-End Lane Position Estimation Using Deep Neural Networks: in CVPR Workshops (pp. 38-45) presents an approach to estimate lane positions directly using a deep neural network that operates on images from laterally-mounted down-facing cameras. To create a diverse training set, they present a method to generate semi-artificial images.

U.S. Pat. No. 9,286,524B titled "Multi-task deep convolutional neural networks for efficient and robust traffic lane detection" assigned to University of Technology Sydney, Toyota Motor Corp provides a computing device comprising of one or more processors for controlling operations of the computing device; and a memory storing data and program instructions used by the one or more processors, A paper by Angelova, Anelia, et al. titled "Real-Time Pedestrian Detection with Deep Network Cascades" presents a new real-time approach to object detection that exploits the efficiency of cascade classifiers with the accuracy of deep neural networks. Deep networks have been shown to excel at classification tasks, and their ability to operate on raw pixel input without the need to design special features is very appealing. However, deep nets are notoriously slow at inference time. In this paper, the authors propose an approach that cascades deep nets and fast features, which is both very fast and very accurate. They apply it to the challenging task of pedestrian detection. Our algorithm runs in real-time at 15 frames per second. The resulting approach achieves a 26.2% average miss rate on the Caltech Pedestrian detection benchmark, which is competitive with the very best reported results. It is one of the first work that achieves very high accuracy while running in real-time.

A paper by Xie, Xuemei, et al. titled "Real-Time Illegal Parking Detection System Based on Deep Learning" proceedings of the 2017 International Conference on Deep Learning Technologies, A C M, 2017. DOI: 10.1145/3094243.3094261, provides a novel illegal vehicle parking detection system. Illegal vehicles captured by camera are firstly located and classified by the famous Single Shot MultiBox Detector (SSD) algorithm. After that, a tracking and analysis of movement is adopted to judge the illegal vehicles in the region of interest (ROI).

US patent application US20170300763A1 titled "Road feature detection using a vehicle camera system" by GM Global Technology Operations LLC, provides a computer-implemented method for road feature detection, the method comprising receiving, by a processing device, an image from a camera system associated with a vehicle on a road; generating, by the processing device, a top view of the road based at least in part on the image; detecting, by the processing device, lane boundaries of a lane of the road based at least in part on the top view of the road; and detecting, by the processing device, a road feature within the lane boundaries of the lane of the road using machine learning.

A paper by Zeng, Xingyu, et al. titled "Deep learning of scene-specific classifier for pedestrian detection" provides performance of a detector depends much on its training dataset and drops significantly when the detector is applied to a new scene due to the large variations between the source training dataset and the target scene. In order to bridge this appearance gap, the authors propose a deep model to automatically learn scene-specific features and visual patterns in static video surveillance without any manual labels from the target scene. They also propose a cluster layer in the deep model that utilizes the scene specific visual patterns for pedestrian detection.

A paper by Haloi, Mrinal et al, titled "A robust lane detection and departure warning system." is based on single camera sensor. For lane detection a modified Inverse Perspective Mapping using only a few extrinsic camera parameters and illuminant Invariant techniques is used. Lane markings are represented using a combination of 2nd and 4th order steerable filters, robust to shadowing. Effect of shadowing and extra sun light is removed using Lab color space, and illuminant invariant representation. Lanes are assumed to be cubic curves and fitted using robust RANSAC. This method can reliably detect lanes of the road and its boundary. This method has been experimented in Indian road conditions under different challenging situations and the result obtained was very good. For lane departure angle an optical flow based method were used.

US patent application US20170372161A1 titled "intelligent automatic license plate recognition for electronic tolling environments" by Accenture implements technical solutions that improve the accuracy of automatic license plate recognition. The IALPR analyzes an image of a vehicle proximate to a toll collection point using optical character recognition (OCR), and determines candidate license plate identifications based, at least in part, on the corresponding OCR confidence level. The IALPR can also perform fingerprinting for candidate license plate images and matching analysis with a knowledge base, resulting in additional confidence levels. The IALPR can also perform behavioral analysis on the candidate license plate identifications, including trip context analysis, historical behavioral analysis, or other analytics. The IALPR can generate an overall confidence level for the candidate license plate identifications responsive to the OCR and vehicle fingerprint confidence levels and the behavioral analysis. This enhanced analysis helps the IALPR reduce the number of incorrect license plate identifications and reduce the need for human review.

U.S. Pat. No. 8,509,486B2 titled "Vehicle license plate recognition method and system thereof" by National Chiao Tung University requires a region where a vehicle license plate image exists is detected according to the edge densities of an input image and a vehicle license plate specification. A text area of the vehicle license plate image is divided into a plurality of character images. The character images are binarized to obtain a plurality of binarized character images. A plurality of characters is recognized from the binarized character images. The characters are recombined to form a character string. The abovementioned steps are repeated to obtain a new character string from another image of the same vehicle, which is captured at a next time point. The character string is compared with the new character string character by character to obtain a comparison result for verifying reliability of recognition through a voting technique.

U.S. Pat. No. 8,184,863B2 titled "Video speed detection system" by American Traffic Solutions Inc. provides a system and method for measuring vehicle speeds using video sensing. The system comprises a tracking camera that generates accurately time-stamped video sequences of the monitored road at high frame rates and a processing unit that analyzes the video sequences in real time to detect moving vehicles and calculate their speeds using the time-over-distance method. The system automatically detects moving vehicles in each image frame and derives vehicle positions from a projective mapping established from reference markers on the road. Time information is obtained from the date and time stamp associated with each image frame. In one example, the system also allows a user of the system to set a trigger speed, and the system automatically saves a video clip of the vehicle whose speed exceeds the trigger speed, recording the speeding vehicle passing through the monitored traffic zone defined by the reference markers.

Chinese patent CN202422420U titled "Illegal parking detection system based on video monitoring by Dalian University for Nationalities" provides a utility model discloses an illegal parking detection system based on video monitoring. The illegal parking detection system comprises an image collector, an image processor, an alarm system and a display, wherein the image collector is used for collecting a video image and outputting a video sequence; the image processor is used for carrying out background modeling on the video sequence collected by the image collector by utilizing a codebook model, obtaining a foreground likelihood information image by adopting a background subtraction method.

US patent application US20150235091A1 titled "Lane-line recognition apparatus by Denso Corp" provides an apparatus for recognizing a lane line, comprising of an edge-point extractor configured to extract edge points in an image of surroundings of a subject vehicle including a roadway ahead of the subject vehicle U.S. Pat. No. 9,305,223B1 titled "Vision-based indicator signal detection uses spatiotemporal filtering" by Google LLC provides an autonomous vehicle is configured to detect an active turn signal indicator on another vehicle. An image-capture device of the autonomous vehicle captures an image of a field of view of the autonomous vehicle. The autonomous vehicle captures the image with a short exposure to emphasize objects having brightness above a threshold.

EP patent application EP2487454A2 titled "Vehicle length estimation" by Scania CV AB describes a method for determining the configuration of a moving vehicle The invention comprises also a system for determining the configuration of a moving.

EP patent application EP2574958A1 titled "Road-terrain detection method and system for driver assistance systems" by Honda Research Institute Europe GmbH describes a road terrain detection system that comprises a method for classifying selected locations in the environment of a based on sensory input signals such as pixel values of a camera image.

The method according to any of the preceding claims, wherein the method applied for a specific road terrain such as "road-like area", "drivable road", "ego-lane", "non-ego-lane", "non-drivable road", "sidewalk", "traffic island", or "off-limits terrain" is automatically parameterized by using positive and negative samples, which are given by training regions such as polygons.

EP patent application EP2578464A1 titled "Video-based warning system for a vehicle" by Honda Research Institute Europe GMBH describes a warning system that can be implemented in any kind of, in order to efficiently detect moving objects. The system utilizes at least one camera for a continuous imaging of the surroundings of the vehicle. Thereby, moving objects can be monitored. A computing unit is programmed to estimate a motion of any moving object based on a pixel motion in the camera image. If a dangerously moving object is detected, a warning unit can be used for issuing a warning signal.

EP patent application EP2863338A2 titled "Delayed vehicle identification for privacy enforcement" by Xerox Corp describes a method for recognition of an identifier such as a license plate includes storing first visual signatures, each extracted from a first image of a respective object, such as a vehicle, captured at a first location, and first information associated with the first captured image, such as a time stamp. Then a second visual signature is extracted from a second image at different times and locations EP patent application EP2966590A1 titled Lane level traffic by Here Global BV describes a method in which lane level traffic levels are determined based on traffic camera images. A controller aligns a three-dimensional map with a traffic camera view, and identifies multiple lanes in the traffic camera view based on lane delineations of the three-dimensional map.

WO patent application WO2015056105A1 titled "Forward-facing multi-imaging system for navigating a vehicle" by Mobileye Vision Technologies describes a system and method which use cameras to provide autonomous navigation features. In one implementation, a driver-assist system is provided for a vehicle.

WO patent application WO2013009697A1 titled "Image-based vehicle detection and distance measuring method and apparatus" by Bendix Commercial vehicle systems describes an image based vehicle detection and measuring apparatus that employs an accelerated, structured, search method is described for quickly finding the extrema of a multivariable function.

WO patent application WO2014130178A1 titled "A method to detect nearby aggressive drivers and adjust driving modes" by Google Inc. describes a computing device may be configured to receive sensor information indicative of respective characteristics of vehicles on a road of travel of a first vehicle. The computing device may be configured to identify, based on the respective characteristics, a second vehicle that exhibits an aggressive driving behavior manifested as an unsafe or unlawful driving action. Also, based on the respective characteristics, the computing device may be configured to determine a type of the second vehicle. The computing device may be configured to estimate a distance between the first vehicle and the second vehicle.

EP patent application EP3038012A1 titled "Signal for identifying traffic lights for computer vision" by Kaparazoom SLU describes a method for identifying traffic lights. The invention relates to a signal for identifying traffic lights for pedestrians, using an electronic urban guidance device with computer vision, for blind or visually impaired people. Said identification signal can be used to identify other types of urban elements.

U.S. Pat. No. 9,779,314B1 titled "Vision-based detection and classification of traffic lights" by Waymo LLC describes an autonomous vehicle having a vehicle control system. The vehicle control system includes an image processing system. with the image processing system providing instructions to control the autonomous vehicle based on the particular candidate portion representing an illuminated component of a traffic light.

U.S. Pat. No. 9,428,192B2 titled "Vision system for vehicle" by Magna Electronics Inc. describes a vision system for a vehicle includes a forward facing camera configured to be disposed at a windshield of a vehicle so as to have a forward field of view through the windshield of the vehicle. The forward facing camera is operable to capture image data for an adaptive speed control system of the vehicle. U.S. Pat. No. 7,720,580B2 titled "Object detection system for vehicle" by Magna Electronics Inc. describes an imaging system which includes an imaging array sensor and a control. The image array sensor comprises a plurality of photo-sensing pixels and is positioned at the with a field of view exteriorly of the vehicle.

U.S. Pat. No. 8,446,467B2 titled "Combined speed detection, video and timing apparatus by Combined speed detection, video and timing apparatus" by TILTON; Scott K. et al. describes a system of combination speed-detection, video-recording, and timing device that can be hand-held.

US patent application US20160293002A1 titled "mobile number plate recognition and speed detection system" by EKIN; Akif describes a mobile number plate recognition and speed detection apparatus placed on the vehicles, i.e., police vehicle, with the aim of security, characterized in comprising camera which is placed at two sides of the base—front right and front left—and enables the apparatus to capture image;

US patent application US20120148105A1 titled "Automated license plate recognition system and method using human-in-the-loop based adaptive learning" by Xerox Corp. describes an automated license plate recognition (ALPR) system and method using a human-in-the-loop based adaptive learning approach. One or more images with respect to an automotive vehicle can be segmented in order to determine a license plate of the automotive vehicle within a scene. An optical character recognition (OCR) engine loaded with an OCR algorithm can be further adapted to determine a character sequence of the license plate based on a training data set. A confidence level with respect to the images can be generated in order to route a low confidence image to an operator for obtaining a human interpreted image. The parameters with respect to the OCR algorithm can be adjusted based on the human interpreted image and the actual image of the license plate. A license plate design can be then incorporated into the OCR engine in order to automate the process of recognizing the license plate with respect to the automotive vehicle in a wide range of transportation related applications.

U.S. Pat. No. 7,363,133B2 titled "Lane detection system and method" by Valeo Schalter and Sensoren GmbH describes a lane detection system for a vehicle, having a camera for sensing the carriageway markings in front of the vehicle, and an evaluation unit for evaluating the data collected by the camera.

WO patent application WO2016069253A1 titled "Augmented lane detection using kinematic data" by TRW Automotive U.S. LLC describes a system and method provided for detecting the departure of a vehicle from a set of land boundaries. A boundary determination component is configured to determine an associated set of lane boundaries for a vehicle.

WO patent application WO2007023103A1 titled "Lane Departure Warning And/or Lane keeping system" by Stephan Voltz describes a lane departure warning and/or lane keeping system for a motor vehicle comprising a sensor unit, which is oriented in the travel direction of the motor vehicle and is used for identifying traffic lane(s).

U.S. Pat. No. 8,587,649B2 titled "Lane departure warning system" by Create Electronic Optical Co Ltd describes a lane departure warning system (LDWS) installed on vehicles is revealed. The LDWS includes a camera that captures road images and the data of images is sent to an electronic control unit (ECU) for processing and recognition. The ECU is directly connected with a global positioning system (GPS) that provides vehicle speed signals so as to check whether dangerous driving occurs.

U.S. Pat. No. 9,760,806B1 titled "Method and system for vision-centric deep-learning-based road situation analysis" by TCL Research America Inc. describes a method and system for vision-centric deep-learning-based road situation analysis are provided. The method can include: receiving real-time traffic environment visual input from a camera; determining, using a ROLO engine, at least one initial region of interest from the real-time traffic environment visual input by using a CNN training method KR patent application KR20170105845A titled "Driving assistant apparatus, distance detection method and width of lane detection method" by Hyundai Auto describes a system and method for generating a front image containing the other vehicle which is located at the front by a front camera and; And to a driving support apparatus for a control unit for the actual characters on the basis of distance information controls the speed or traveling direction of the vehicle.

EP patent application EP3143607A1 titled "Systems and methods for curb detection and pedestrian hazard assessment" by Mobileye Vision Technologies (Jerusalem) Ltd describes a system for a vehicle to identify at least one edge line candidate as an edge line of the curb.

EP patent application EP3261017A1 titled "Image processing system to detect objects of interest" by Delphi Technologies Inc. describes a method of detecting objects of interest in a vehicle image processing system using convolutional neural networks (CNNs)

WO patent application WO2017190574A1 and Chinese Patent CN105975929A, titled "Fast pedestrian detection method based on aggregation channel features" by Peking University Shenzhen Graduate School describes a fast pedestrian detection method based on aggregation channel features, which comprises an early-stage position calibration process and a later-stage position screening process. By using the technical solution of the present invention, where a training data amount is large, the classifier can automatically select features with a good recognition ability to serve as a pedestrian judgment basis.

WO patent application WO2017136578A1 titled "Partially occluded object detection using context and depth ordering" by Honda Motor Co., Ltd. describes a system and method for verifying detection of partially occluded objects (e.g., pedestrians) in the vicinity of a vehicle. An image input device captures an image and/or video of surroundings.

CN patent application CN106845430A titled "Pedestrian detection and tracking method based on accelerated area Convolutional Neural Network" by Donghua University describes a pedestrian recognition and tracking method based on an accelerated area Convolutional Neural Network where a pedestrian in an infrared image can be effectively recognized, and real-time tracking for a pedestrian target in an infrared video can be achieved.

CN patent application CN107154045A titled "Computer-vision-based method for localizing vehicle with peccancy pressing-line behavior in traffic flow diversion region" by Original Assignee Nanjing University of Aeronautics and Astronautics describes a method for localizing a vehicle with a peccancy pressing-line behavior in a flow diversion region. With the method disclosed by the invention, detection of line pressing by a vehicle in congestion can be realized CN patent application CN107481526A titled "Detecting traffic lane change violation Records system and method for a lane change control report" by Ministry of Public Security Third Institute describes a system and method for detecting traffic lane change CN patent application CN106935035A titled "Illegal parking vehicle real-time detection method based on SSD neural network" by Xi'an University of Electronic Science and Technology describes a vehicle real-time detection method based on an SSD neural network, and mainly solves the problems of low detection accuracy and weak robustness under the condition of complex roads and changeable illumination of weather.

CN patent application CN106373426A titled "Computer vision-based parking space and illegal lane occupying parking monitoring" method by Chengdu Tongjia Youbo Technology Co., Ltd. Describes an analysis and detection method to solve the problems of high detection cost and low efficiency of space detection and lane occupying detection in the prior art.

CN patent application CN106327878A titled "Movable illegal parking snapshot system and implementation method" by Tianjin Zhonghuan System Engineering Co., Ltd. describes a movable snapshot system and an implementation method when an behavior is established as total time of a vehicle target in an area exceeds a time threshold value preset by a system.

CN patent application CN107491753A titled "Parking violation detection method based on background modeling" by University of Electronic Science and Technology describes a detection method based on background modeling, firstly inputted video traffic monitoring dynamic background modeling, monitoring of the scene to obtain the background image;

CN patent application CN106652465A titled "Method and system for identifying abnormal driving behavior on road" by Chengdu Tongjia Youbo Technology Co., Ltd. describes a method and system for identifying an abnormal driving behavior on road through vehicle identification and a driving direction expressed by an extracted lane line to determine a vehicle driving against the traffic.

India Patent Publication 52/2017 titled "Automatic Helmet and Number Plate Detection System" provides automatic helmet and number plate detection system. This invention detects helmet and number plate on the vehicle along with the correct number plate format by taking account the vehicle type i.e. LMV, HMV or trucks. The invention uses Mega-pixel cameras placed at a distance of 50-100 m to capture the high-resolution images and extracts the number plate characters from the number plate.

Chinese Patent CN104200668 by Sichuan University titled "Image-analysis-based detection method for helmet-free motorcycle driving violation event", discloses for helmet detection, a head top average saturation degree and an initial set value Sd, calculated and compared with each other, and a model identification technology based on a support vector machine used for identifying the license plate.

Chinese Patent CN106372662 by Tencent Technology titled "Helmet wearing detection method and device, camera, and server", comprises: obtaining a scene video image, detecting the scene video image to obtain human position through a human position detection model built by training learning, and determining whether the human position is located in a helmet wearing area or not;

Chinese Patent CN106408000 by State Grid Corporation of China titled "Method and device for intelligent detection on personnel safety helmet", provides a method comprises steps that a personnel sample picture of the personnel included in a first preset quantity is acquired, and a safety helmet sample picture of the personnel with a safety helmet included in a second preset quantity is acquired; DPM training of the personnel sample picture is carried out to generate a personnel distinguishing device.

Chinese Patent CN106295551 by Nanjing University Of Science And Technology titled "Worker safety helmet wearing real-time detection method based on video analysis", based on color of the helmet and its location, where it should be.

A paper titled "Intelligent System For Helmet Detection Using Raspberry Pi", describes a method that ensures helmet possession by a motorcyclist at all times by capturing a snapshot of the rider's helmet using Pi Camera and confirming object detection by Haar cascading technique. A paper titled "detection of motorcyclists without helmet in videos using convolutional neural network", by C. Vishnu et al, provides an approach in which first they use adaptive background subtraction on video frames to get moving objects. Later convolutional neural network (CNN) is used to select motorcyclists among the moving objects. Again, we apply CNN on upper one fourth part for further recognition of motorcyclists driving without a helmet. The performance of the proposed approach is evaluated on two datasets, IITH_Helmet_1 contains sparse traffic and IITH_Helmet_2 contains dense traffic, respectively.

A paper titled "classification of motorcyclists not wear helmet on digital image with backpropagation neural network", by Sutikno et al provides a system that was built is divided into two parts, namely training process and testing process. Backpropagation neural network architecture of this system consists of 400 inputs, one hidden layer consists of 40 neurons, and one output.

A paper titled "automatic Helmet Detection on Public Roads", by Maharsh uses background subtraction and optical character recognition for fall detection and for helmet detection it uses background subtraction and Hough transform descriptor.

A paper titled "Traffic Sign Recognition with Multi-Scale Convolutional Networks" by Sermanet et. al, provides in traditional ConvNets, the output of the last stage is fed to a classifier. In the present work the outputs of all the stages are fed to the classifier. This allows the classifier to use, not just high-level features, which tend to be global, invariant, but with little precise details, but also pooled low level features, which tend to be more local, less invariant, and more accurately encode local motifs.

A paper titled "Traffic Sign Detection based on Convolutional Neural Networks", by Y. Wu et. al., provides an approach for traffic sign detection based on Convolutional Neural Networks (CNN) by first transforming the original image into the gray scale image by using support vector machines, then use convolutional neural networks with fixed and learnable layers for detection and recognition. The fixed layer can reduce the amount of interest areas to detect, and crop the boundaries very close to the borders of traffic signs. The learnable layers can increase the accuracy of detection significantly.

A paper titled "traffic Sign Classification Using Deep Inception Based Convolutional Networks" by Mrinal Haloi, provides a deep network consists of spatial transformer layers and a modified version of inception module specifically designed for capturing local and global features together. Spatial transformer network capable of generating automatic transformation of input image is used to make classification more robust and accurate along with a modified version of GoogLeNet.

United States Patent Application US20130049988A1 by Marc Roeber et al. titled "Device and method for traffic sign recognition" provides a method and apparatus for determining whether to alert a driver of a vehicle to the presence of a traffic sign in the vehicle's driving environment.

Chinese Patent CN106022300 by INSTITUTE OF INFORMATION ENGINEERING, CAS titled "Traffic sign identifying method and traffic sign identifying system based on cascading deep learning", provides a traffic sign identifying method and a traffic sign identifying system based on cascading deep learning. By introducing a cascading convolutional neural network idea, expanding target sign sample space, and adding more samples having supervision functions, identification of traffic signs is additionally provided with more apriori information European Patent EP1096457B1 by Volkswagen Aktiengesellschaft titled "Method and device for electronic recognition of traffic road signs", provides a method and a device for electronic recognition of road signs are in which the traffic signs detected with a arranged in the motor vehicle electronic camera and interpreted electronically via pattern matching method and displayed in the vehicle and/or act on the automatic speed control of the motor vehicle.

U.S. Pat. No. 6,560,529B1 by Holger Janssen titled "Method and device for traffic sign recognition and navigation", provides a method and a coupled system for road sign recognition and for navigation is proposed, which enables a bidirectional data transmission between the road sign recognition device and the navigation device.

U.S. Pat. No. 8,983,136B2 by Ricoh Company, Ltd. titled "Traffic sign detecting method and traffic sign detecting device", provides a method and a device for detecting traffic signs in an input image camera. The method comprises a color space converting step of converting the input image into a HSV color space image; a filtering step of filtering, based on a predetermined pass range of a standard color of each of the traffic signs, the HSV color space image to obtain a filtered image, and then generating one or more connected domains based on one or more regions in the filtered image;

United States Patent Publication US20110109476A1 by Mitsubishi Electric Research Laboratories Inc. titled "Method for Recognizing Traffic Sign", provides a method recognizes a set of traffic signs in a sequence of images acquired of a vehicle environment by a camera mounted in a moving vehicle by detecting in each image, a region of interest (ROI) using a parameter space transform. "same" or "different." This enables construction of an efficient multi-class classifier.

A paper titled "License Plate Detection and Recognition Using Deeply Learned Convolutional Neural Networks", by Computer Vision Lab, Sighthound Inc., Winter Park, Fla., provides an end-to-end license plate detection and recognition method using novel deep CNNs. They claim it to be not only computationally inexpensive, but also it outperforms competitive methods on several benchmarks after conducting successful experiments on leading benchmarks.

A paper titled "Reading Car License Plates Using Deep Convolutional Neural Networks and LSTMs" by Hui Li, Chunhua Shen, tackles the problem of vehicle license plate detection and recognition in natural scene images using deep neural networks and LSTMs to learn high-level features in a cascade framework, which lead to improved performance on both detection-recognition. Firstly, they train a 37-class convolutional neural network (CNN) to detect all characters in an image, which results in a high recall, compared with conventional approaches such as training a binary text/non-text classifier. False positives are then eliminated by the second plate/non-plate CNN classifier. The paper "Vehicular Number Plate Recognition Using Edge Detection and Characteristic Analysis of National Number Plates", proposes a framework that uses a camera installed at roadside to detect the vehicle number plate. They use Sobel edge detection for plate localization, template matching and fuzzy logic for recognition. They make use of the characteristics of the vehicle number sequences to further enhance performance.

Chinese Patent CN104298976 by University Of Electronic Science And Technology Of China titled "License plate detection method based on convolutional neural network", provides license plate images under different conditions can be accurately recognized through the Adaboost license plate detector based on the Haar characteristics and the convolutional neural network complete license plate recognition model, meanwhile, characters are segmented through the multi-threshold segmentation algorithm, character images can be more easily and conveniently segmented.

Chinese Patent CN106250892 by Wan Yongxiu titled "Automatic recognition method for license plate characters", provides the following steps of inputting a colorful vehicle image; obtaining current light intensity; if the current light intensity is higher than preset light intensity, adopting a license plate location algorithm based on color point pair search and mathematical morphology to carry out license plate location on the colorful vehicle image to obtain a license plate image.

Chinese Patent Publication CN106845480 titled "Method for recognizing license plate from picture", provides a method, the license plate positioning is realized through combination of color positioning and Sobel positioning; through carrying out color judgment on the picture of the license plate, carrying out binaryzation and extracting a character outline and a circumscribed rectangle, the character segmentation is realized; and the characters of the license plate are recognized through a neural network algorithm.

Chinese Patent CN106874907 by Beijing Haidian Branch Of Bocom Intelligent Information Technology Co., Ltd. titled "License plate recognition model establishing method and device", provides a method by which The license plate images are enlarged to a preset size to acquire license plate image samples; a number of license plate image samples and license plate information in the license plate image samples are used as training data to train a neural network model until the recognition rate of the neural network model for the license plate information of the license plate image samples is greater than a preset threshold or the loss value of the loss function of the neural network model converges to a preset value; and the trained neural network model is used to recognize the license plate information of a license plate image to be recognized.

United States Patent Publication 20130311075A1 filed by Continental Automotive Systems, Inc. teaches a safety system for motorcycle comp-rises at least one sensor mounted to the motorcycle to sense a feature of an environment surrounding the vehicle. An electronic control unit is configured to receive a signal from the at least one sensor and determine a probability that a safety incident may occur based upon the at least one feature.

U.S. Pat. No. 9,704,060B2 by Feiyue Wang titled "Method for detecting traffic violation", relates to a technical field of traffic monitoring, and more particularly to a method for detecting traffic violation. The present invention includes firstly localizing vehicle salient parts through salient features including vehicle license numbers and vehicle rear lights, and representing a vehicle with the vehicle salient parts, then tracking the vehicle with a Kalman filter based on the vehicle salient parts, and finally detecting vehicle violation through moving trajectory analysis and setting violating detecting areas.

Indian Patent 220469 filed by Diagaraj. R for "Side Stand Detection" relates to the field of automobiles industry, especially for two-wheeler vehicles using side stand apart from the Main center stand provided therein for the resting of the vehicle. The invention in particular provides an electronic circuit system which alarms or sirens the person handling the vehicle about the unreleased side stand and there by prevent him from being endanger or to have safe movement. Thus the present invention provides an alarm system for the vehicle handler or rider about the ignorance to release the side stand under vehicle movement.

U.S. patent application Ser. No. 15/689,350, titled "On-demand Roadway Stewardship System", filed by Jayant Ratti, provides an on-demand roadway stewardship system with video reporting features is disclosed. The invention described herein is comprised of a system that allows users with mobile device cameras to record and report roadway safety incidents, traffic violations, crimes and infrastructure problem. Users are encouraged to become stewards by engaging in the system's rewards program. An on-demand style cloud infrastructure is presented which speeds up video processing and citations. Objects of the invention are to enhance safety and increase public participation in safety.

SUMMARY OF THE INVENTION

Some of the objects of the present disclosure, which at least one embodiment herein satisfies are as listed herein below.

This summary is provided to introduce a selection of concepts in a simplified form to be further described below in the Detailed Description. This summary is not intended to identity key features or essential features of the claimed subject matter, nor is it intended to be used to limit the scope of the claimed subject matter.

It is a general object of the present disclosure to provide an artificial intelligence based systems and methods that can replace humans for determination of traffic violations.

Another object of the present innovation is the method of placing the AI based system as a module to the Stewardship network to act as a specialist or an auditor or a data collector. FIG. 18 shows the AI unit whereas other spots are being used by humans to co-work along with the AI. As AI continues to become mature, the need for humans in the network would reduce.

An example formation of the BPO style model for the traffic violation processing could have several specialists who identify and categorize the traffic violations as seen on the footage captured for cameras on the field. A specialist is by role, either a computer software, or machine or a person who reviews the incoming videos for potential traffic law violators. These specialists can cover one or more of various categories of violations such as: wrong driving, wrong parking, commercial violation, vehicle fitness, among others; as previously mentioned the specialists can be a hybrid mix of humans and Artificially Intelligent Software/Machines. Once the specialists categorize the videos and issue citations, the citations/violations are reviewed by auditors to ensure correctness and fairness. The auditors may themselves be a hybrid mix of software/machines and persons. The admins and supervisors watch over the various specialists and auditors to ensure quality of work. This model can grow in various manners by adding layers of management, staff, artificially intelligent governing software, and operators similar to other well defined BPO models which have been successfully deployed in various industries including call centers, tech support, customer care and more, but with the added advantage of potentially including Artificial Intelligence Agents (Specialists, Auditors etc.) to compliment the activities of persons as completely described in U.S. patent application Ser. No. 15/689,350 titled "On-demand Roadway Stewardship System"

Another objective of the innovation is to classify various visual features of interest on the road. The AI based system would have a detection module that recognizes a region of interest in an image and classifies it as a vehicle or a person or static/dynamic markings or a policeman.

Another objective of the invention is the identification of the region of interest (ROI) of a vehicle in a series of images along with at least one among the ROIs of road signs, road markings, policeman, person, in the same series of images is sufficient to determine a violation of motor vehicle laws/guidelines.

Another objective of the disclosure is the recognition of the ROI of a vehicle along with at least one among the ROIs of road signs, road markings, policeman, person, in the same image is sufficient to determine a violation of motor vehicle laws/guidelines.

Another objective of the disclosure is the disclosure of the AI based system, wherein the region of interest (ROI) of a vehicle in a single image is sufficient to determine a violation of motor vehicle laws/guidelines.

Another objective of the disclosure is of an annotation module configured to read license plates captured by the detector module.

Another objective of the AI based system to include an occlusion module, which hides objects ROI or hides non-ROI information in the image or series of images or video. This is done in some cases for privacy of certain individuals, in other cases to bring to attention only the concerned areas which are of interest. In some cases this is helpful in making aware publically the kinds of violations and perpetrators. Such can be used in driving training schools and for the courts when the citation is challenged by the violator Another objective of the AI based system is the detection module which is further configured to detect traffic violations based on the orientation and position of the vehicle. For example the vehicle may be driving on the wrong side of the road; the vehicle may be parked in an irregular manner not conforming to the orientation of the said parking area or block traffic thereby, among other reasons.

Another objective of the AI based system is that the detection module further takes into account the position, orientation and location of other vehicles, relative to the vehicle of interest to determine traffic violations. For instance if a vehicle is trying to tailgate another vehicle, or is trying to overtake another vehicle very closely or in a dangerous manner or is trying to squeeze another vehicle aggressively to force the other to brake, etc. are forms of aggressive driving which need to be monitoring using the AI system.

Another objective of the AI based system is to add a calculation module configured to calculate a speed of said object utilizing object detection from the location of the said object in different frames of the video or series of images and the relative velocity of the vehicle installed with the said data collector. The vehicle could be moving or stationary, its velocity would be computed based on information received from the GPS and other inertial measurement sensors on the mobile device.

Another objective of the system further comprises: an allocation module configured to allocate, one or more parking slot options, based on detection of said parking slots or by matching the host of the parking spot to the driver in need of a parking spot. The owners of the parking spaces can list their availabilities and the illegally parked car owners can be notified regarding their violation and then matched to a parking spot available nearby.

Another objective of the system is to connect/partners with taxi service provider companies to provide limited access to the data of drivers or in another aspect, every challan linked to the vehicles will be served to the company owning such vehicles.

Another Objective of the disclosure is the ability for vehicle drivers/motorists to lift and drop-off their friends, or friends of friends and other acquaintances from a point A to point B without the need for a commercial drivers' license or commercial permit. The aiding of the people can be termed as Ubering (coined form the business model of the company Uber. In some countries like India, any driver transporting other people for money is considered a commercial transaction and hence requires a commercial driver's permit. However, giving ride to acquaintances for a charge can circumvent a purely commercial activity hence keeping laws of the land in place. Such is already in existence with friends sharing cars and car-pooling to go to similar destinations, or even as a gesture of good faith.

Another objective of the disclosure is to devise a method for accumulating training data from specialists by having them annotate license plate numbers of a vehicle, creating bounding boxes around vehicles, identifying the types, make, model and other information about the vehicle and also various violations about the vehicle. The information along with computer logic, would determine the type and severity of a violation.

Another objective of the disclosure is for accumulating training data by monitoring GPS and odometric data from the data collectors' sensors automatically from the sensors available to the data collector on their mobile camera device. This information can be used for various training purposes such as over speeding training among others.

Another objective is to create a Stewardship network, where in the system is a game, such that the data collectors, specialists who review the video of series of images collected by the data collectors and auditors who review the work of the specialists, earn points based on the volume and accuracy of the detection of traffic violations. Such points and scores can be used for purchase of goods, merchandize, online shopping, etc. Auditors can also be other specialists in an exemplary example, or vice-versa.

Another objective of the disclosure is the ability for users to pay using their points or other digital means to purchase add-ons within the program (such as automated challenging feature, priority assessment of their captured violations, etc.), also for being able to pay for their challans/citations received by the authorities Another objective of the systems is the ability to switch to digital currencies like Bitcoin or such points being awarded in Internet Currencies or Crypto currencies such as Bitcoin, Ethereum, Ripple, among others to be flexible for spending across the world without frequent currency exchanges and other benefits of the cryptocurrencies in general.

Another objective of the system is the ability for a simplified way to capture an event through a remote trigger among other gesture triggers possible to trigger the capture of the same. The input module which records the manual gesture of a person such as a button press, or a touch among others with a transmitter module, which transmits the said gesture to the data collector and some mounting hardware which mounts the gesture recognition device to another object or person. The same gesture sensor would be powered by a cell/battery or other power sources. The presence of a remote gesture sensor allows for several benefits including allowing the driver to have their hands on the wheel and not handle the mobile phone; which is illegal/unlawful in many cities.

In an aspect of the present disclosure relates to an artificial intelligence (AI) based system. The system includes a non-transitory storage device having embodied therein one or more routines and one or more processors coupled to the non-transitory storage device and operable to execute the one or more routines. The one or more routines include a receiving module that enables to receive at least an object detection signal from one or more vision sensing systems, said object detection signal comprises said images associated with said objects; a determining module, that enables to determine for said objects, a region of interest (ROI) selected from the received images; a detection module that enables to detect a real-time location, a real-time position, a real-time movement, and a category associated with said objects contained in the received images.

In an aspect, a capturing module that enables to capture one or more traffic violations selected from a combination of a motorists not wearing a helmet while driving, a vehicle carrying goods or loads beyond the bounding box of the vehicle, vehicles having no side mirror installed or side mirror not open, more than two people riding on a two wheeler, broken reflector, and non-standard license plates.

In an exemplary aspect, the data collector can also collect data from the front camera of the mobile phones there by providing information on the facial/body dynamics of the passengers and driver inside a car. The benefit could be optional but greatly add to the safety of drivers and passengers in case of night time driving, or in case of long driving conditions, where drowsiness can cause alarming consequences to life and property.

An aspect of the present disclosure relates to a method for detecting objects in images and videos using a deep neural network wherein the method can include the steps of receiving, by a system, at least an object detection signal from one or more vision sensing systems, said object detection signal comprises said images associated with said objects; determining, by the system, a region of interest (ROI) selected from the received images for said objects; detecting, by the system, a real-time location, a real-time position, a real-time movement, and a category associated with said objects contained in the received images.

In an aspect, the method further includes a method for accumulated training data from specialists by having them annotate license plate numbers of a vehicle, creating bounding boxes around vehicles, identifying the types, make, model and other information about the vehicle and also various violations about the vehicle.

In an aspect, the proposed system and method has an ability to capture both the road data and the road side data. By capturing and identifying roadside advertising, such as sign boards, traffic signals, notices, and more and directly correlating that to the direction of Gaze of the passengers and driver in the vehicle. The cross-correlation can be used to determine whether the signs on the roads/road-sides are coming into the gaze of the people, alternatively if they are effective in delivering the message to the drivers and passengers.

For example in one embodiment, the road side hoardings are advertising the use and sale of Gasoline at a Gas Station, by identifying the direction of gaze from one of the cameras and cross-matching the same with the position of the same advertising in the view field of the phone and camera, it can be determined to a reasonable accuracy/probability that the driver and/or passenger is looking at that particular advertisement.

In another aspect, another embodiment of the same feature extends to road safety applications, where road-side traffic warnings or road-safety symbols are present. The direction of gaze, the motion of the vehicle along with the position of the signs in the view field of the camera, when combined can estimate reasonably, whether the driver/passenger is observing the road signs/warnings/traffic symbols. This can lead to improvement in the location and orientation of such signs for maximum viewing efficacy.

As compared to the existing solution, the present invention proposes utilizing deep convolutional neural networks and machine vision based algorithms like image segmentation to perform a task of detection and recognition to provide complete solution to safe, legal and comfortable parking, driving and riding system for commuters on the roadways. Parking management systems and vacancy indication services in particular, can play a valuable role in reducing traffic and energy waste in large cities. Also proper driving on the roads can lead to faster and safer commute. Since the advent of modern, engineered roadways in the early 1800s, local, state and federal authorities have continued working on ways to curb roadway violations.

Various objects, features, aspects and advantages of the present disclosure will become more apparent from the following detailed description of preferred embodiments, along with the accompanying drawing figures in which like numerals represent like features.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Embodiments of the present disclosure provide a technological solution to a major and common problem of inefficient and illegal parking.

In an exemplary embodiment, the present invention proposes a new technique/mechanism and a complete solution to safe parking. It is a crowd-sourced and crowd-funded on-demand field. The present invention has comprehensively structured our approach based on both manual and automated aspects of the model. Further, the side benefits of the solution are radical. It will drastically improve frequent decongestion of traffic and road management system. The haphazard conditions of roads, which not only cause inconvenience but also are sources of environmental pollution, are improved. The manual aspect of our proposed model provides monetary benefits to the people and could prove to be a source of easy supplementary income. The automated process alone would be beneficial only to organized and standard situations. Countries like India, however, have high percentage areas that are unorganized and unsystematic. Therefore a regularized method and more than just automated system is required to tackle the problem. As a solution one need to allocate space for vehicles to park which stands the major concern for us. The approach that presents invention provides simple, smart and effective solutions. It not only provides comfort to the vehicle bearer but also eases things for the authorities. Visual detection methods combined with deep neural networks have proved to give state-of-art results on various domains and applications. The automated aspect of the proposed invention is based on three major sub-aspects. 1. Detecting illegally parked vehicles, 2. Detecting and recognizing their license plate number, and 3. Detecting available vacant parking spots while providing information about which could be given to the owner itself.

According to the first aspect of the present invention, to build an AI agent, a real-time Illegal Parking Detection System can be built; it can be a very robust method of single shot multi-box detector algorithm is used for detection module that gives better results than other widely used algorithms like Faster RCNN and YOLO.

The input of the system can be a real-time signal or a recorded/captured data coming from the data collectors with a camera. Since the illegal regions in different scenarios varies, the ROI need to be marked manually. The images are provided as input into a trained SSD network to detect the location and category of all vehicles contained in the image by setting a suitable hyper-parameter.

In order to make SSD more suitable for the data set, the present invention redesigns the aspect ratios of the default boxes in original SSD.

The system analyzes the state of the vehicles being tracked during the whole tracking process. The distance that the vehicle moves in the region of interest is obtained by making the difference between the positions of the adjacent two frames. If the difference between the two positions is greater than a given threshold, it is considered to be moving. The alarm will be triggered when the stop time of any vehicle exceeds the given threshold which is being calculated simultaneously. Once a vehicle stops for examples for 5, or 10 or 15 s, it will be identified as illegal parking, and system will begin to time for illegal vehicles until they move. This can be also obtained by the sighting of the same vehicle by a different data collector at another time and the vehicle's persistent presence at the location would be marked as illegal parking.

In an embodiment of the first aspect of the proposed invention, speed calculation of the vehicle detected. In an embodiment, the present invention helps to identify each vehicle video and finds their corresponding distance covered in consecutive frames. The proposed invention tracks each vehicle (or their license plates) and traces their centroid in upcoming frames to get the distance travelled by that vehicle. The proposed invention uses the array of structure to store centroid of each vehicle. In this as vehicle is arrived into the region of interest in the video their corresponding bounding box is created by the detection algorithm, and then the proposed invention generates the centroid of the bounding box. In another variant of the same speed detector, we consider tracking the license plate of the vehicle instead of the vehicle in itself, since license plates remain 2D rectangular shapes, viewed from any direction or distance.

1. speed is calculated by measuring the distance covered by the cars from one frame to another by using the formula of $$\text{speed} = \frac{\text{distance covered in unit of pixels}}{\text{time}} \qquad (i)$$

In an exemplary embodiment, we get the speed of the vehicle with the data collection device through onboard sensors such as accelerometers, gyroscopes and GPS. The relative speed of the Vehicle or its license plate is calculated by measuring the angle at which the vehicle is sighted in the field of view of the camera and accordingly the relative velocity is determined through simple geometrical calculations. This information coupled with the absolute speed of the camera gives the absolute speed of the vehicle in ROI.

In an exemplary embodiment, the present invention provides a detection method that utilizes SSD technique to detect vehicles. This includes the use of deep convolutional neural networks and vision-based analysis. Later performing frame by frame evaluation, the present invention calculates speed of the vehicle using pixel level analysis and relating the actual distance to the pixel distance captured by a camera.

We trained a deep CNN for the task of character recognition. The network is trained with the complete character dataset comprising 35 different classes i.e. 0-9 and Capital A-Z excluding O (Due to the similarity of O and 0, they have considered them the same) and the letter I, so that it is not confused with the number 1.

In an aspect, for testing the model there are two steps performed: Given an input image, the first task is to determine if it contains a license plate. To achieve this task, the present invention runs the image through our deep license plate detection network. As explained above, this network is robust to different conditions (e.g. lighting changes, viewing angles, occlusion, etc.) and license plate variations (e.g. shape, format, background, etc.), making it highly accurate across a range of scenarios.

In an aspect, once the license plate is detected, the present invention needs a mechanism by which the present invention can read the plate. The best approach is to segment/isolate each of the license plate characters, perform character detection and recognition for each individual character before combining the results.

According to the third of the present invention, detecting vacant parking spots and providing this information to the vehicle owner. The present invention proposes a visual parking vacancy indicator system that utilizes deep convolutional neural networks for detection of vacant and occupied parking slots. The robustness of the detection system is ensured by testing it on a large dataset of labeled parking spots.

In an aspect, the detection module is responsible for reporting the occupancy status of a parking stall given the image of the stall. The present disclosure uses a convolutional neural network for this task. Having few constraints on the input data put a heavy burden on the detection system. Therefore robustness and generality of the detection algorithm have the highest priority. This is useful to avoid the space owner to continuously and repeatedly put his empty spot for renting, at sight of the empty spot the space is automatically listed and the space owner get paid the rent for the time their space was used.

One way to do this is to use a network that is based on VGGNet-F. It has five convolutional layers where each is followed by a pooling layer and Rectified Linear activation function. It has three fully connected layers at the end that use the features from the convolutional layers for classification.

In an aspect, the VGGNet architecture features a simple and uniform design throughout the network. Filters' kernel sizes are all 3 beside first two that are 11 and 5 respectively to reduce the network's size. VGGNet-F, which is the smallest of the VGG networks family. In an embodiment, there are various human aspects involved as well, which are performed by the present invention. For example:

1. There are malls, shops, parks and houses that have enough land area around to park a vehicle. But the question arises how to utilize that for parking. Now, given a store that runs from 10 a.m. to 10 p.m. the space around is used by the customers for parking their vehicles. But this is during the working hours. When the shop is closed the present invention can provide use that land. In fact the shopkeeper could lend the land on hourly basis for parking for small amount of cash. In residential places, people have parking area or garage for parking their vehicles. When they leave for work those places lie empty and can serve as parking spot for others. So they too can lend their land or garage on hourly basis for small amount of cash. Hence benefiting both the parties. This approach is not limited to shops and residential places. Anybody possessing relevant land area could login into PARKSAFE account and provide land for parking and earn some easy cash. We term the one who needs parking space as "PARKER" and the one providing parking space "KEEPER".

2. There are deeper aspects to the above approach. Parking spaces need to be safe. Parking elsewhere does not guarantee safety and chance of any mishappening is high and it is not smart to risk expensive vehicle for a couple of bucks. So you will have complete information about the place you are parking. The parker would have option in his PARKSAFE account to rate the place. He could rate the place, post images and comment on the same. If the service was poor or the place is not convenient to park, say due to water logging somewhere or due to lot of potholes nearby or extremely compact places, one can rate the place and keeper poorly and comment on the same. Next time some other user when checks for parking option he will be careful.

3. There needs to be flexibility in our model based on the vehicle to be parked. Suppose one has parking space for two wheelers only he can mention that in his PARK-SPACE account. Similarly for SUVs, Minibus, Vans and Trucks need large space. So if the Keeper has that amount of space he can mention that along with the price. In some rare situations where people own expensive sedan class vehicles which need high security, this proves a reliable solution.

4. Refund Policy—The parker will have an option for demanding refund in case he was not satisfied with the service the keeper provided. If there is a valid reason the keeper is required to pay the refund back.

5. To increase the ratings the keeper can provide add-ons to the parker.
   a) In rainy days, some may prefer to keep their vehicles under a shaded protection, so if the one particular keeper provides shade, parker will prefer it over other options.
   b) To ensure security keeper can equip the parking space with cameras that provide live feed to the parker so that he can access the video and monitor his vehicle.
   c) For large parking areas one can appoint a security guard too and mention as a specialty in his PARK-SAFE Account.

6. The present invention can be linked with Google maps and could use interactive interface to guide our parker the shortest way to the parking spot.

In an exemplary embodiment, the parker and the keeper are connected through server using their PARKSAFE account. Through this network connection Parker receives information about the keeper and so the parking spot. Also through the same the keeper gets information about the Parkers in need for a parking space.

In an exemplary embodiment, the proposed invention provides attempts to provide a technological solution to a major and common problem of catching riders riding two wheelers like motor bikes, scooters, scootys etc. (i) who are not wearing a helmet (either driver or passengers) (ii) who are riding with more than 2 people (iii) who are carrying large loads on their scooter or bikes (iv) who do not have a side mirror installed on their vehicles, among others that constitute a violation as well According to the first aspect of the present invention, detection of motor-cyclists without helmet using CNN:

1. A convolutional neural network (CNN) is a variant of feed forward neural networks using back propagation algorithm. It learns high-level features from the spatial data like image. The convolutional neural network training consist of convolution layers, ReLu layers Max-Pooling layers, fully connected layers and a loss function (e.g. SVM/Softmax) on the last (fully-connected) layer. After obtaining all the objects of motor-cyclists and non-motorcyclists, a CNN model is built using these images to separate the motorcyclists from other moving objects.

2. To recognize motorcyclists without helmet, from the images of motorcyclists, the present invention cropped only the top one fourth part of the image as that was the region where the motorcyclist's head is located most of the time. Once the head portion is obtained, the present disclosure perform a simple count information which gives the total head count on the two wheeler hence the present invention are able to detect no. of people riding on the two wheeler. The present invention applies a basic threshold to generate a signal/indication when there are more than two riders present on the two wheeler.

3. Then the present invention builds a CNN model in order to separate the without-helmet from the with-helmet images. This model is trained for the binary classification of helmet and head.

According to the second aspect of the proposed invention, detection of two wheelers carrying heavy/large loads using deep CNNs:

1. The present invention utilizes detections generated in the first aspect of the invention (recited in the detection of motor-cyclists without helmet using CNN). According to this aspect, before distinguishing between helmet and non-helmet wearers, the present invention detects two wheeler vehicles. Therefore after the vehicle detection present invention performs the second aspect of our experiment.

2. The present invention accordingly builds a CNN model to perform binary classification to distinguish two wheelers carrying heavy load from the ones not carrying. The model is trained on a dataset containing two wheelers carrying heavy load (positive sample) as well as the ones not carrying large loads (negative sample).

According to third aspect of the detection process, detection of side view mirror in the two wheelers using Deep CNNs:

1. First, the present invention annotates data and mark bounding boxes over the side view mirror. Once annotated the present invention have complete data set.
2. The present invention again takes off our training from the detections achieved in the first aspect. The detected two wheelers are then checked for presence of side view mirror. Using common detection algorithms like YOLO/Faster RCNN the present invention move forward with side view mirror detection.

Similarly all various objects of interest are detected in a binary format for category 1 violations. Category 2 violations are given a logic to determine the violation from multiple objects of interest determined in a single image. And finally through multiple images and logic, category 3 violations are detected.

Various objects, features, aspects and advantages of the inventive subject matter will become more apparent from the following detailed description of preferred embodiments, along with the accompanying drawing figures in which like numerals represent like components.

BRIEF DESCRIPTION OF FIGURES

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

Figure 1:
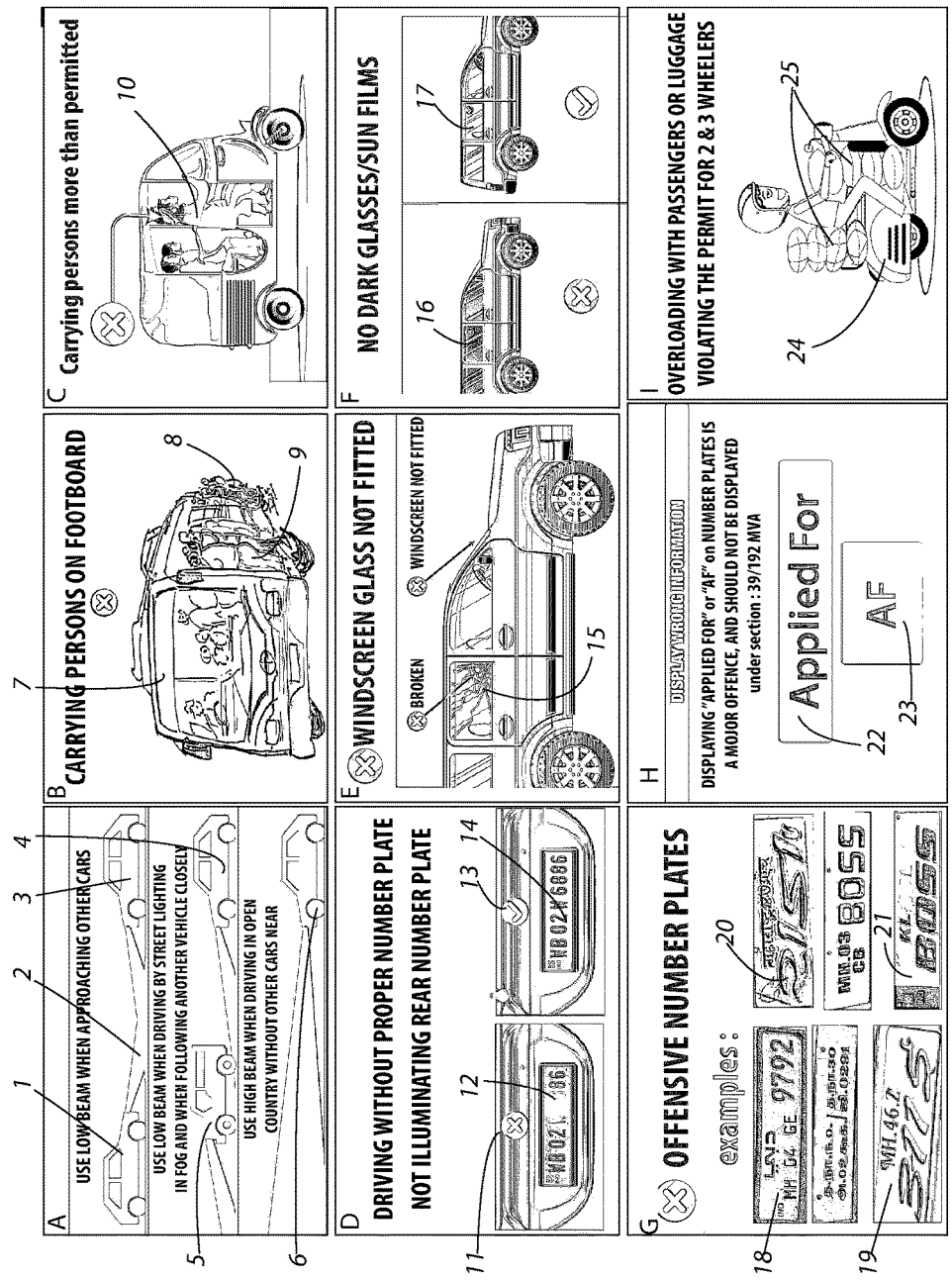

The diagrams are for illustration only, which thus is not a limitation of the present disclosure, and wherein:

FIG. 1 illustrates exemplary motor vehicle violations for Category 1 of the violation types, where all information regarding a violation or deviation from the rules is within the picture of the vehicle and rider together only.

Figure 2:
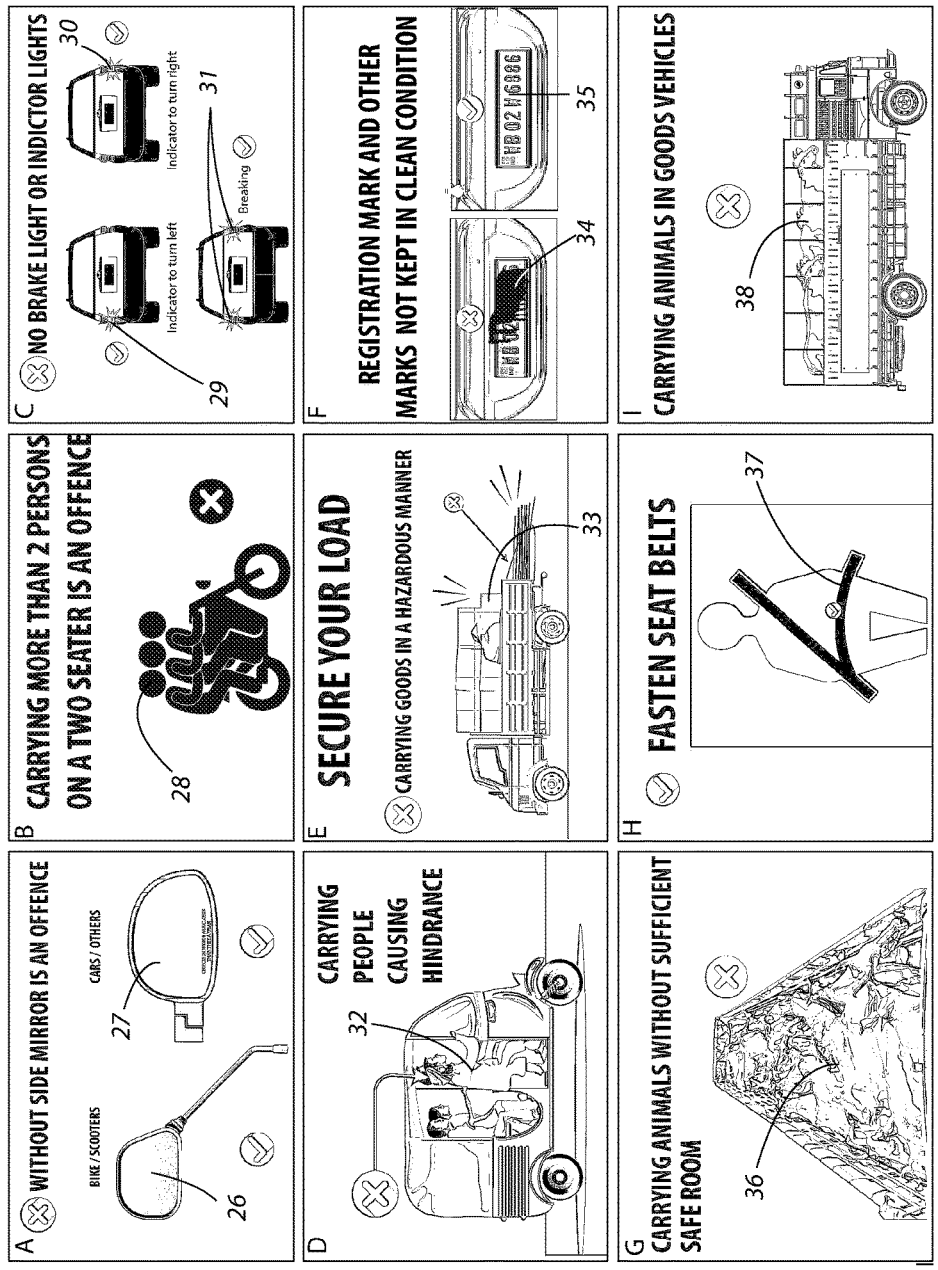

FIG. 2 illustrates exemplary motor vehicle violations for Category 1 of the violation types, where all information regarding a violation or deviation from the rules is within the picture of the vehicle and rider together only.

Figure 3:
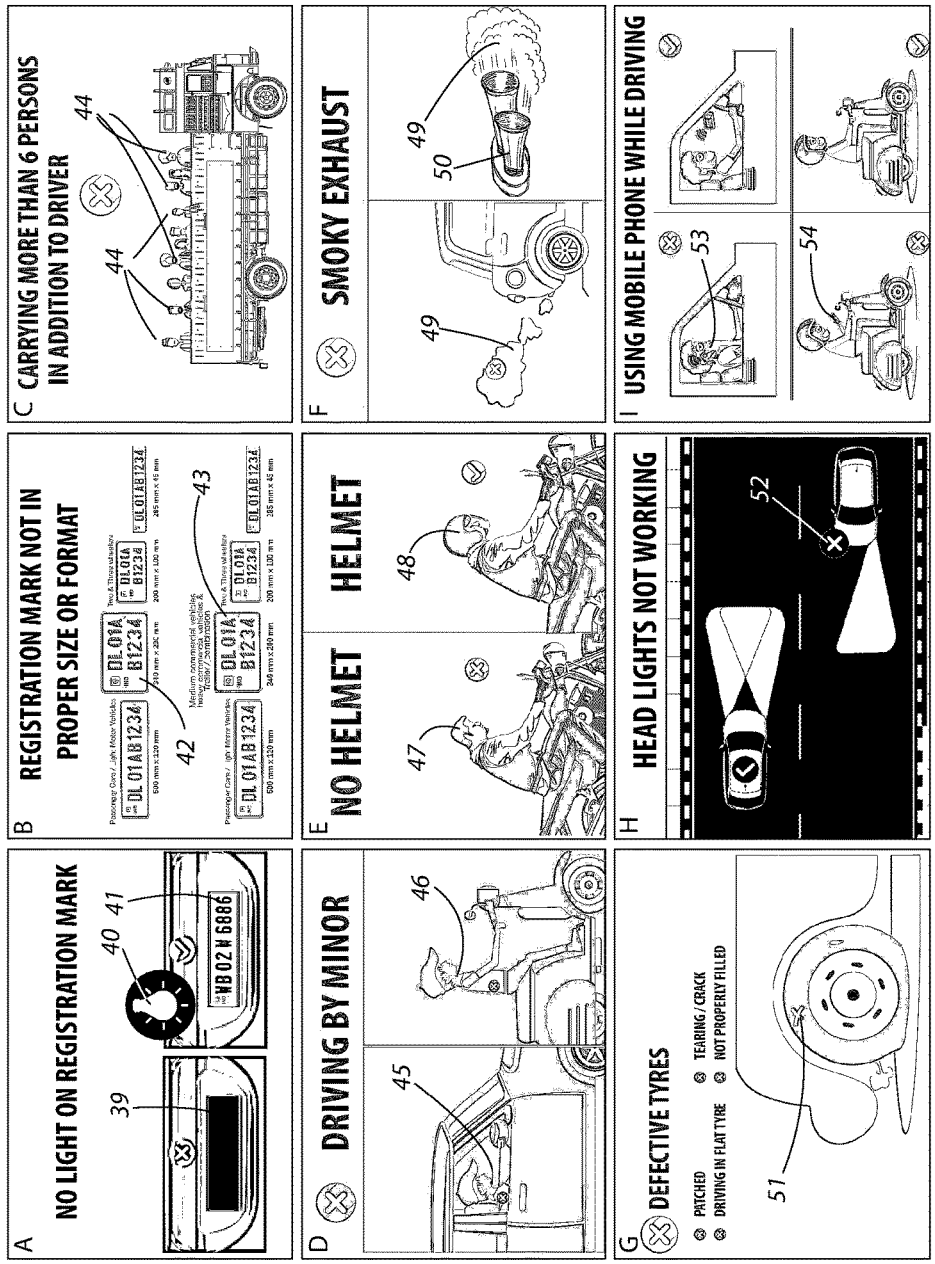

FIG. 3 illustrates exemplary motor vehicle violations for Category 1 of the violation types, where all information regarding a violation or deviation from the rules is within the picture of the vehicle and rider together only.

Figure 4:
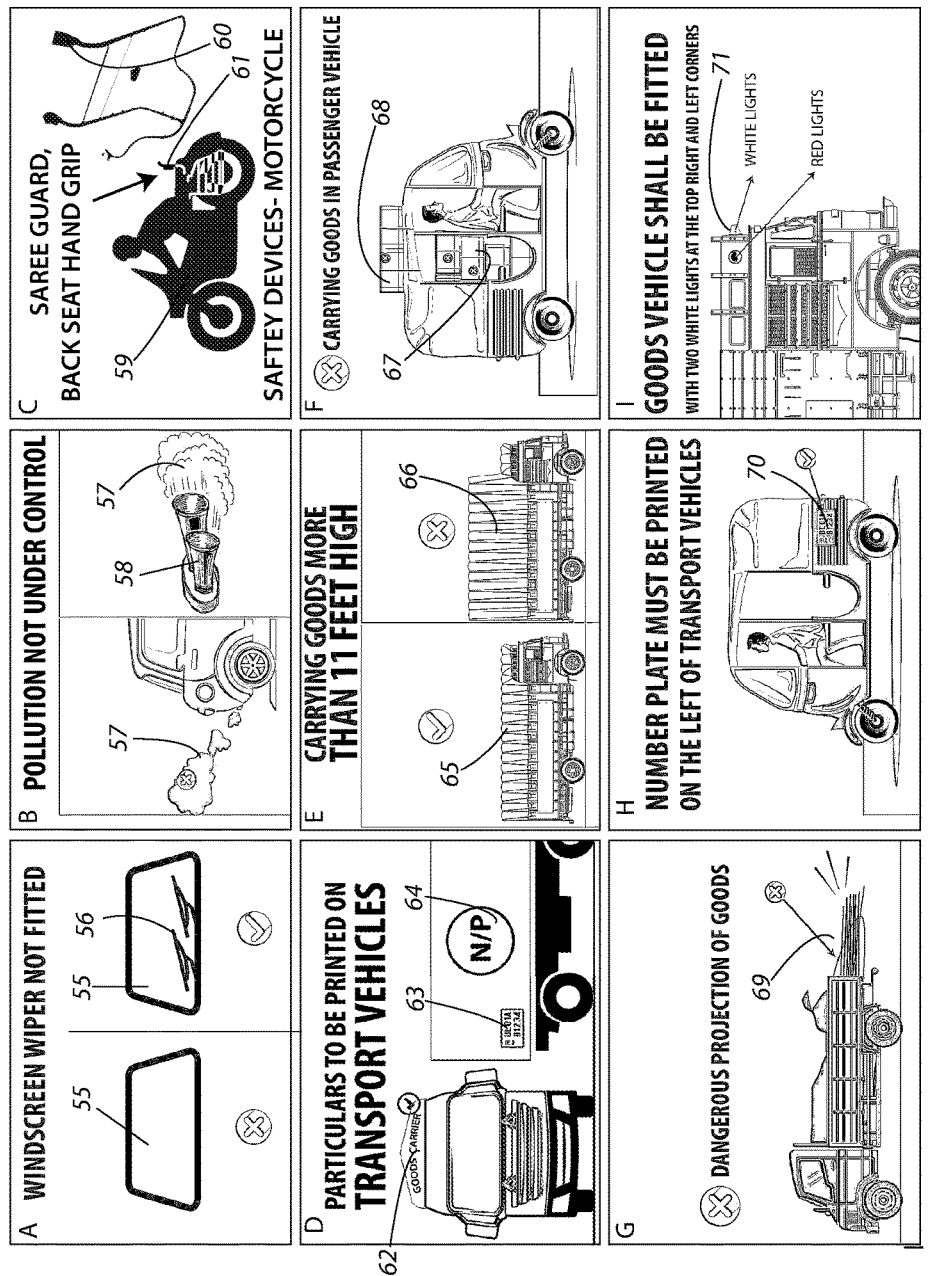

FIG. 4 illustrates exemplary motor vehicle violations for Category 1 of the violation types, where all information regarding a violation or deviation from the rules is within the picture of the vehicle and rider together only.

Figure 5:
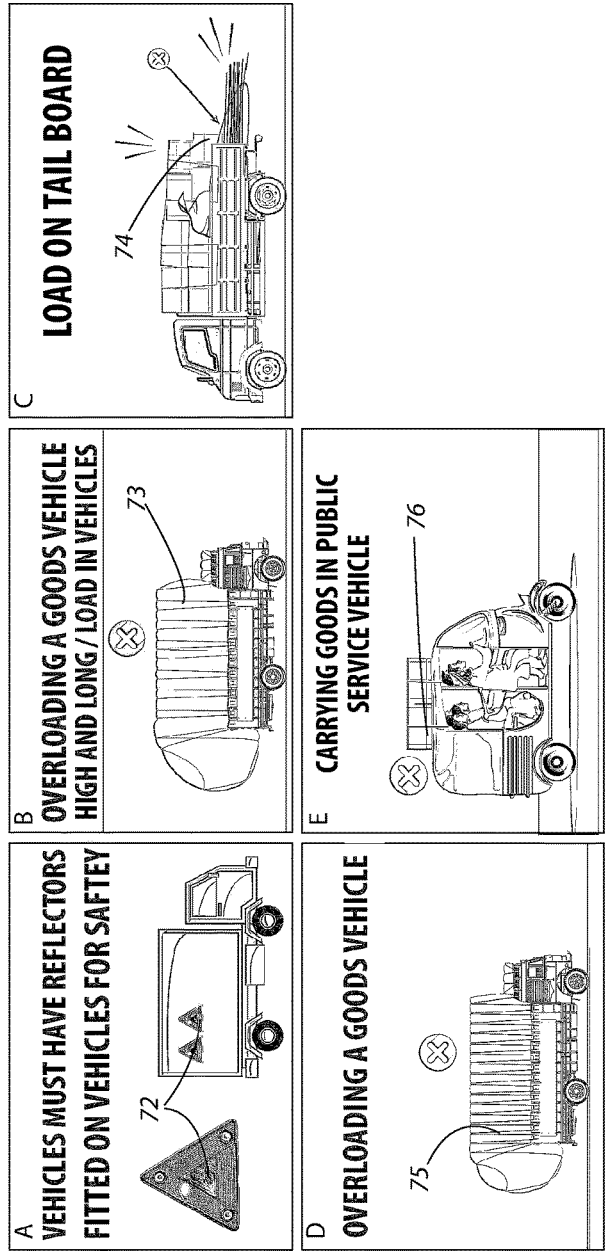

FIG. 5 illustrates exemplary motor vehicle violations for Category 1 of the violation types, where all information regarding a violation or deviation from the rules is within the picture of the vehicle and rider together only.

Figure 6:
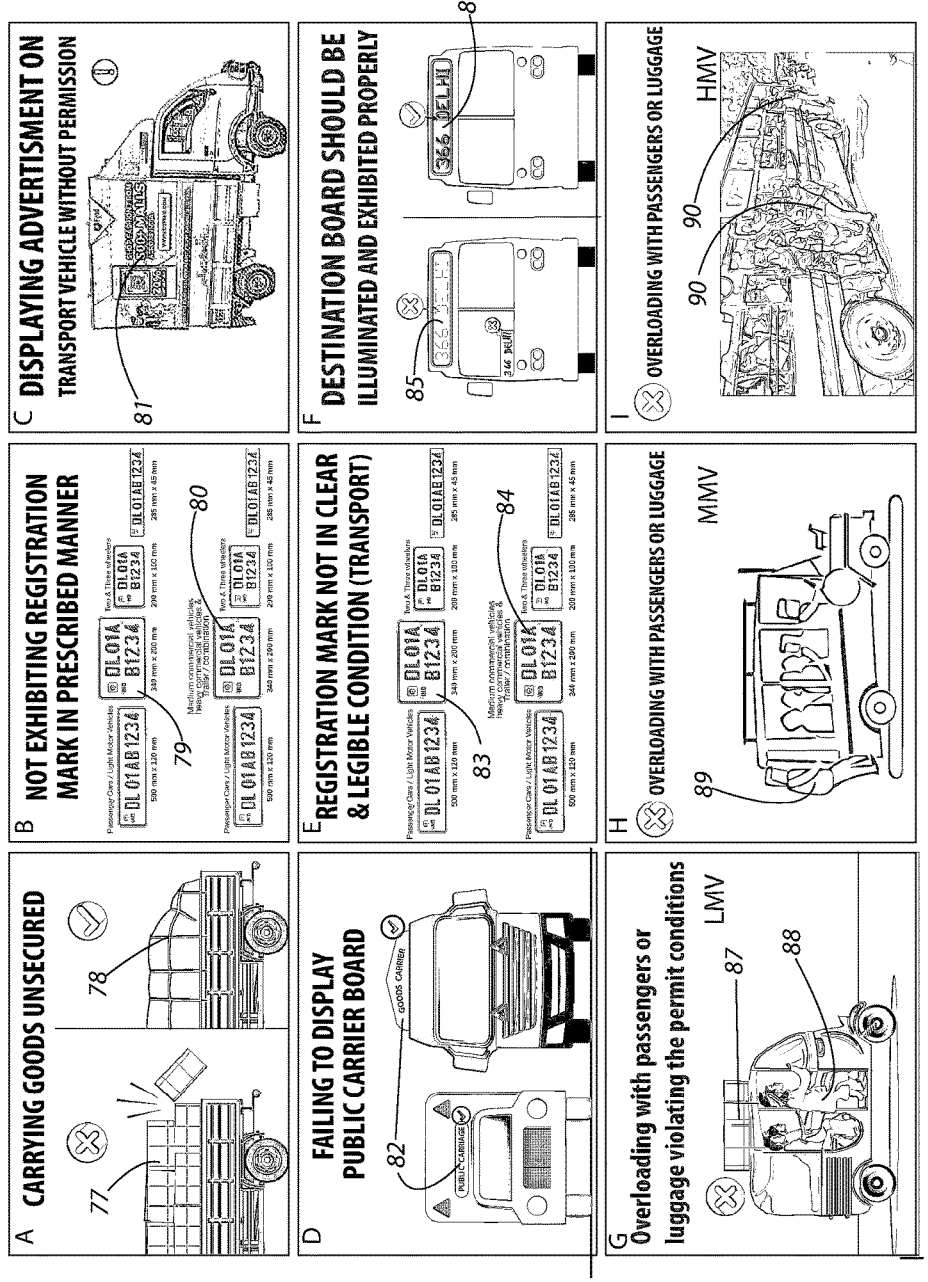

FIG. 6 illustrates exemplary motor vehicle violations for Category 1 of the violation types, where all information regarding a violation or deviation from the rules is within the picture of the vehicle and rider together only.

Figure 7:
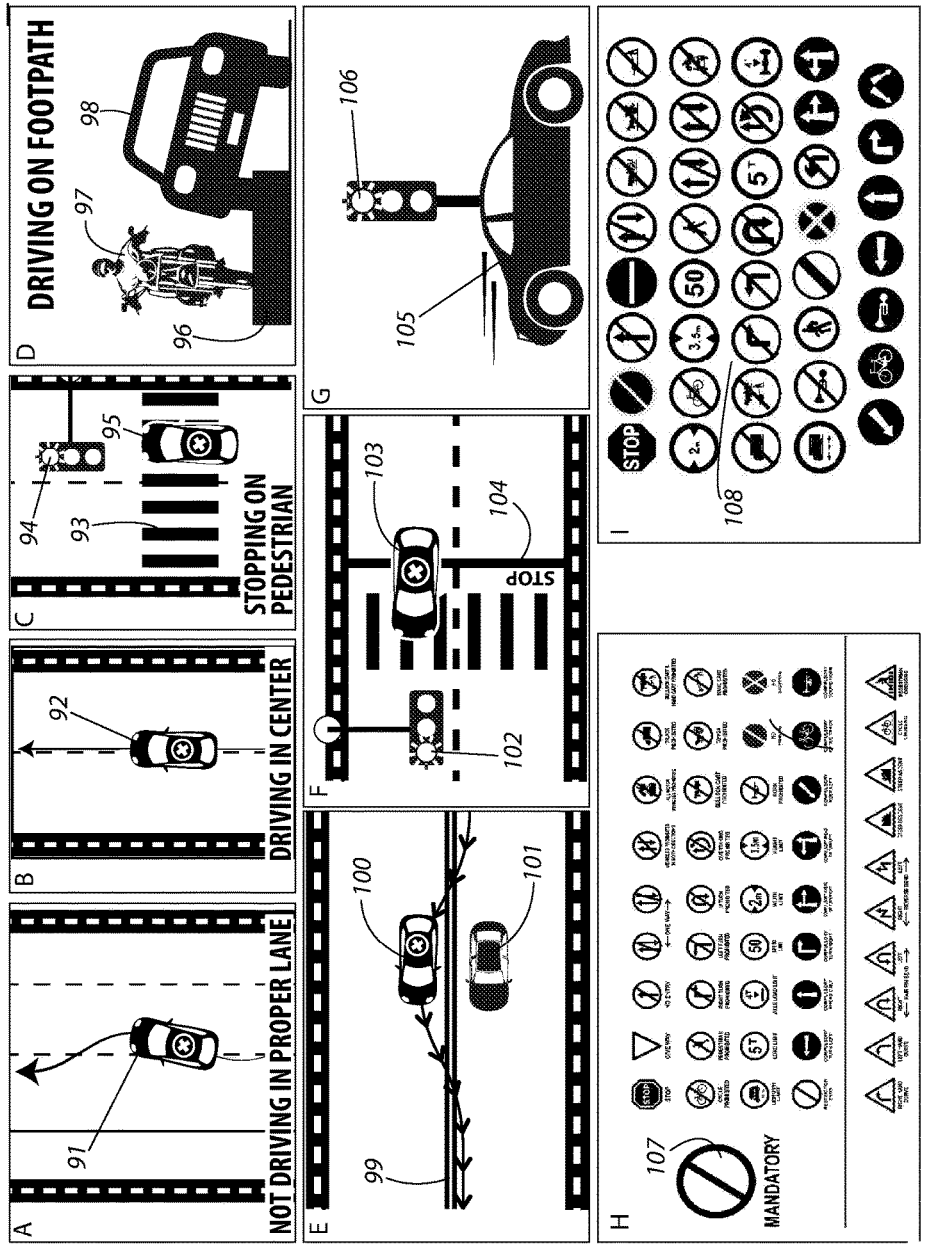

FIG. 7 illustrates exemplary motor vehicle violations for Category 2 of the violation types, where all information regarding a violation or deviation from the rules is captured in a single image showing the vehicle, driver and other roadway information such as signs, markers, objects.

Figure 8:
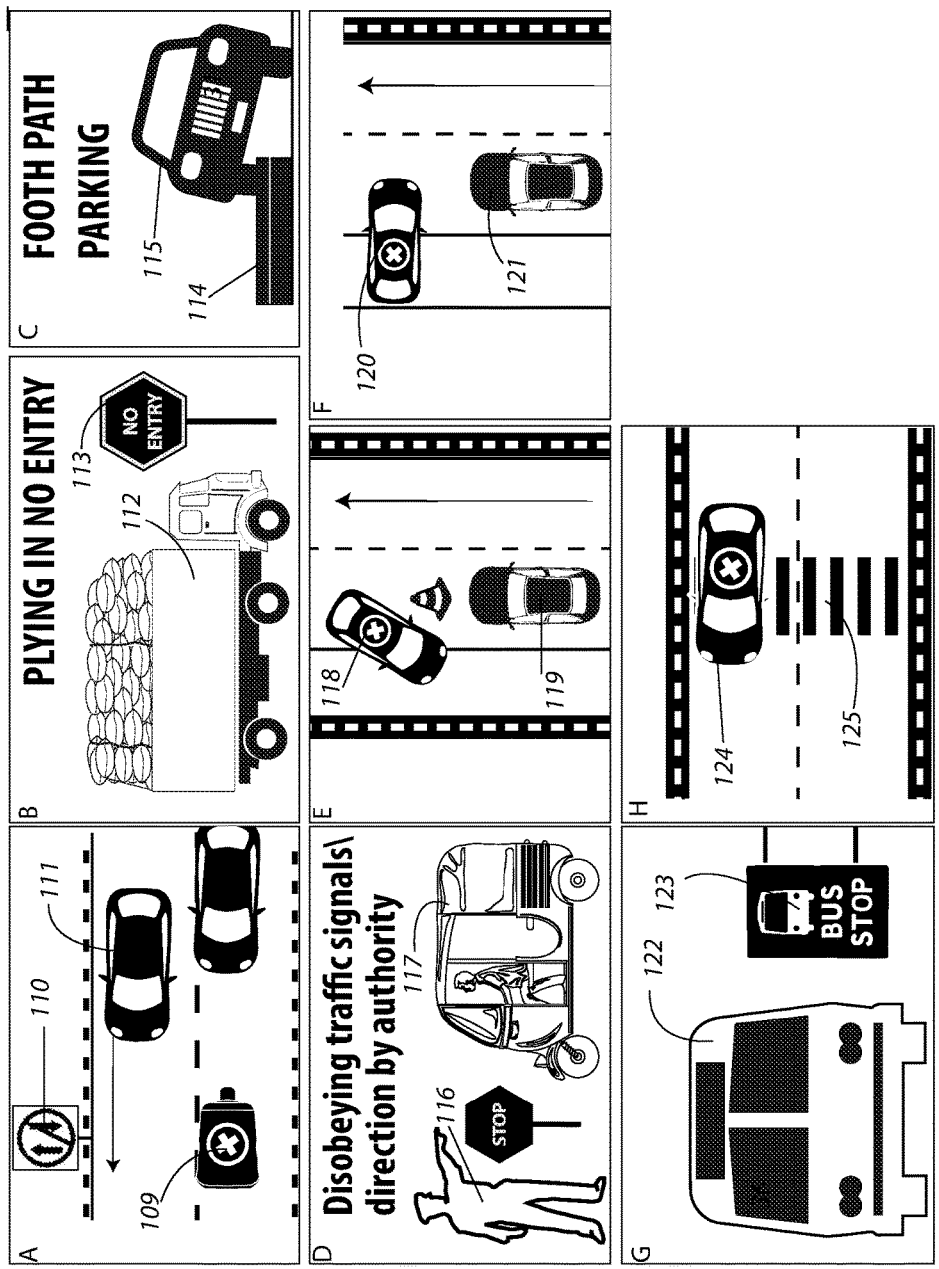

FIG. 8 illustrates exemplary motor vehicle violations for Category 2 of the violation types, where all information regarding a violation or deviation from the rules is captured in a single image showing the vehicle, driver and other roadway information such as signs, markers, objects.

Figure 9:
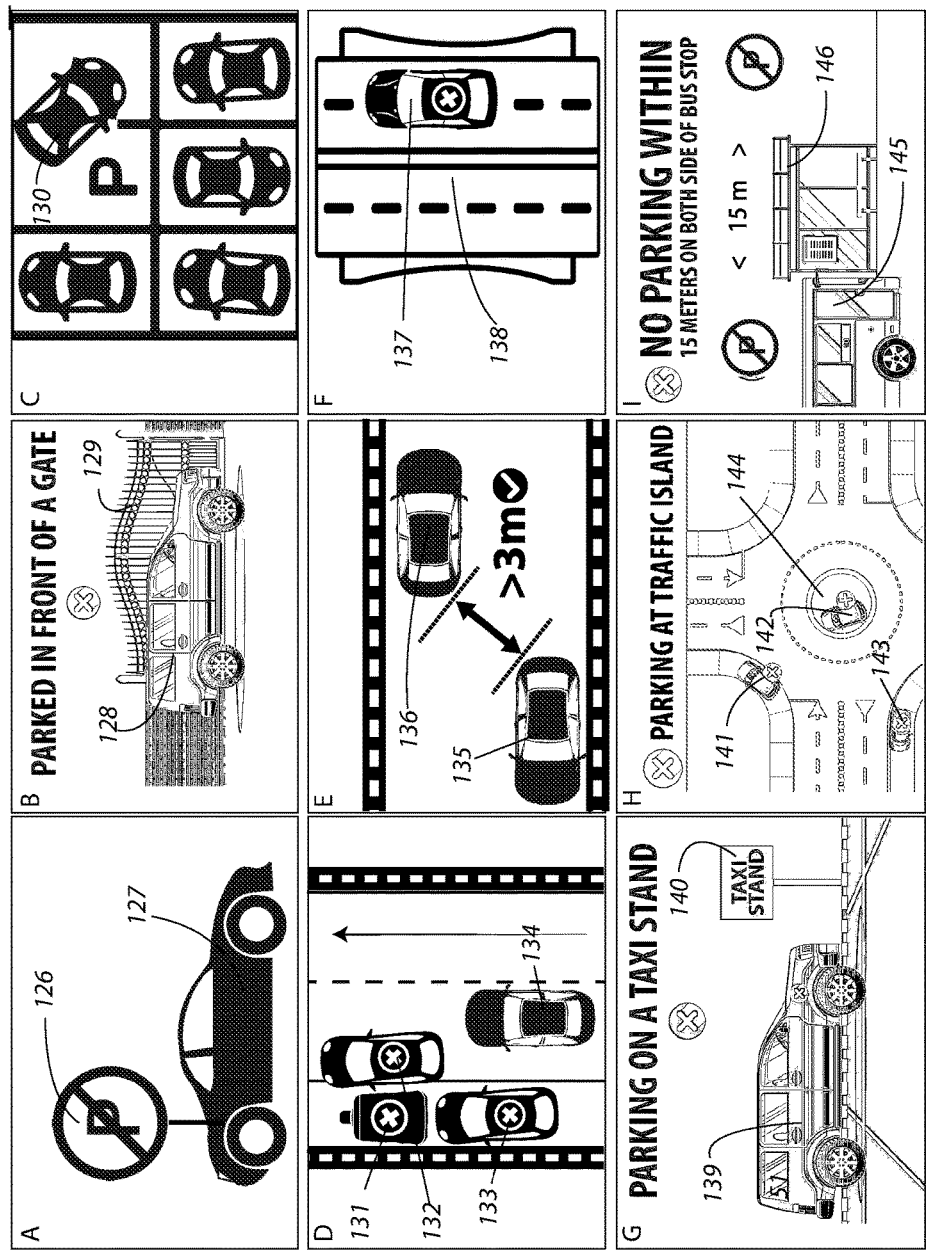

FIG. 9 illustrates exemplary motor vehicle violations for Category 2 of the violation types, where all information regarding a violation or deviation from the rules is captured in a single image showing the vehicle, driver and other roadway information such as signs, markers, objects.

Figure 10:
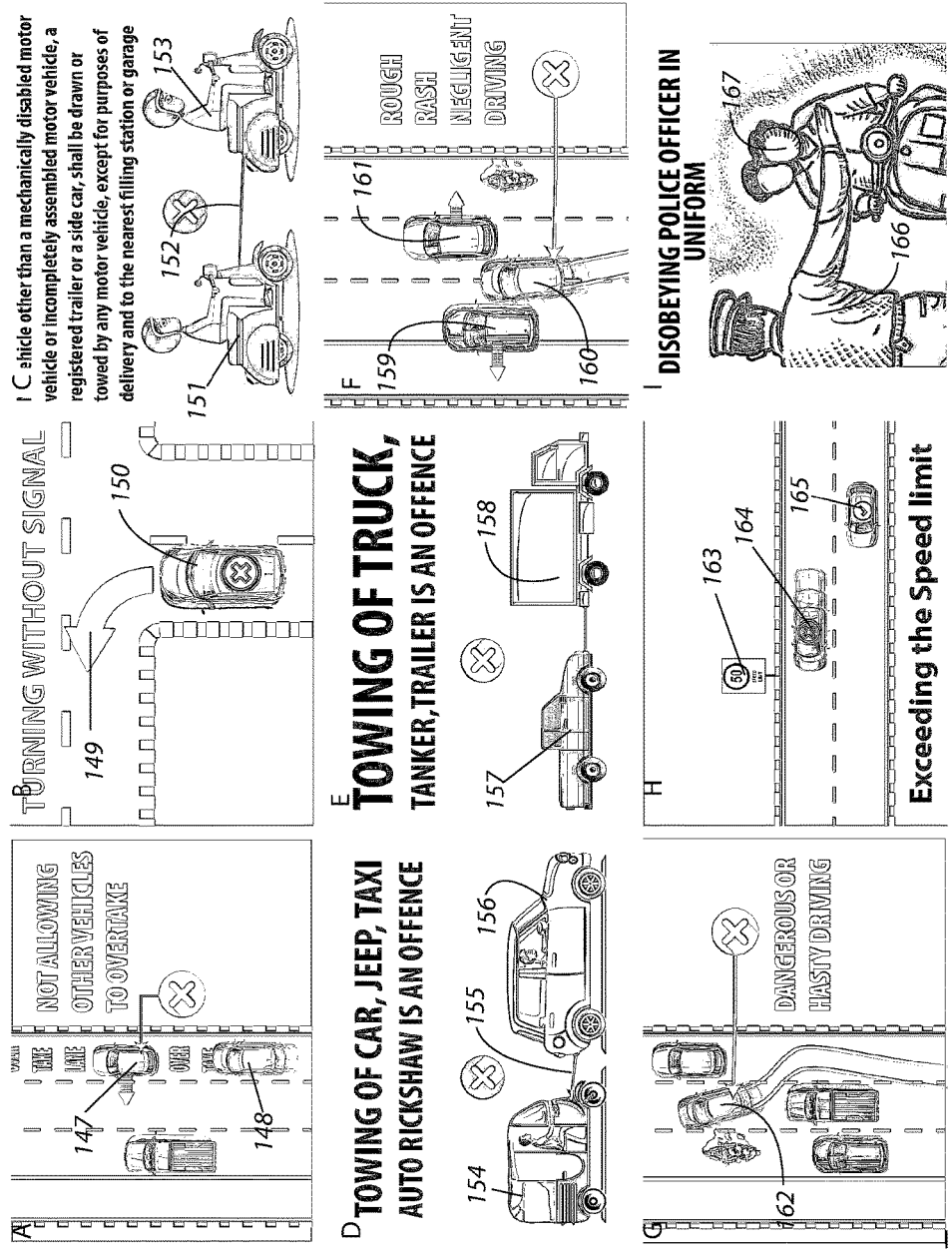

FIG. 10 illustrates exemplary motor vehicle violations for Category 3 of the violation types, where all information regarding a violation or deviation from the rules is captured in a series of images (or video) showing the vehicle, driver and other roadway information such as signs, markers, objects etc.

Figure 11:
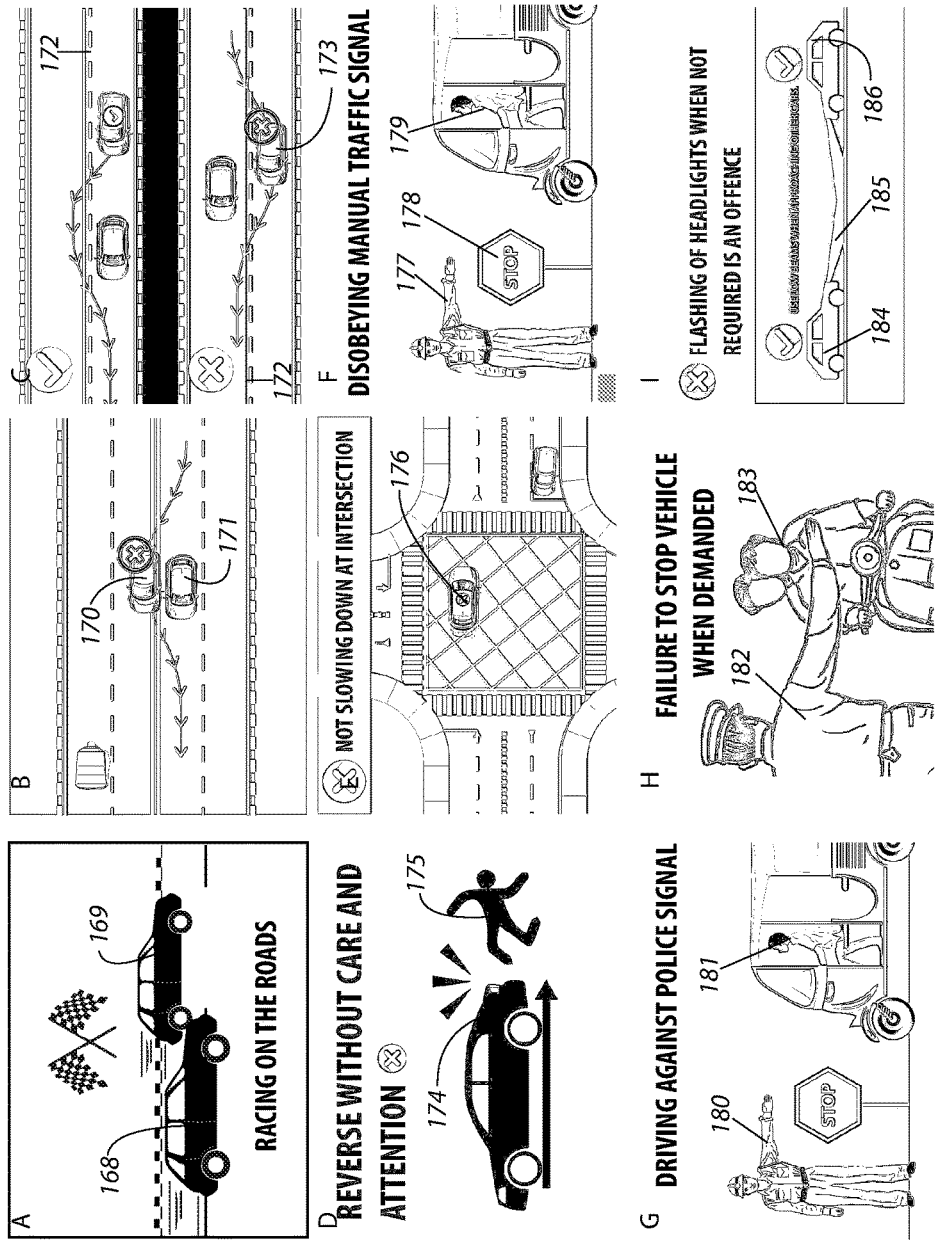

FIG. 11 illustrates exemplary motor vehicle violations for Category 3 of the violation types, where all information regarding a violation or deviation from the rules is captured in a series of images (or video) showing the vehicle, driver and other roadway information such as signs, markers, objects etc.

Figure 12:
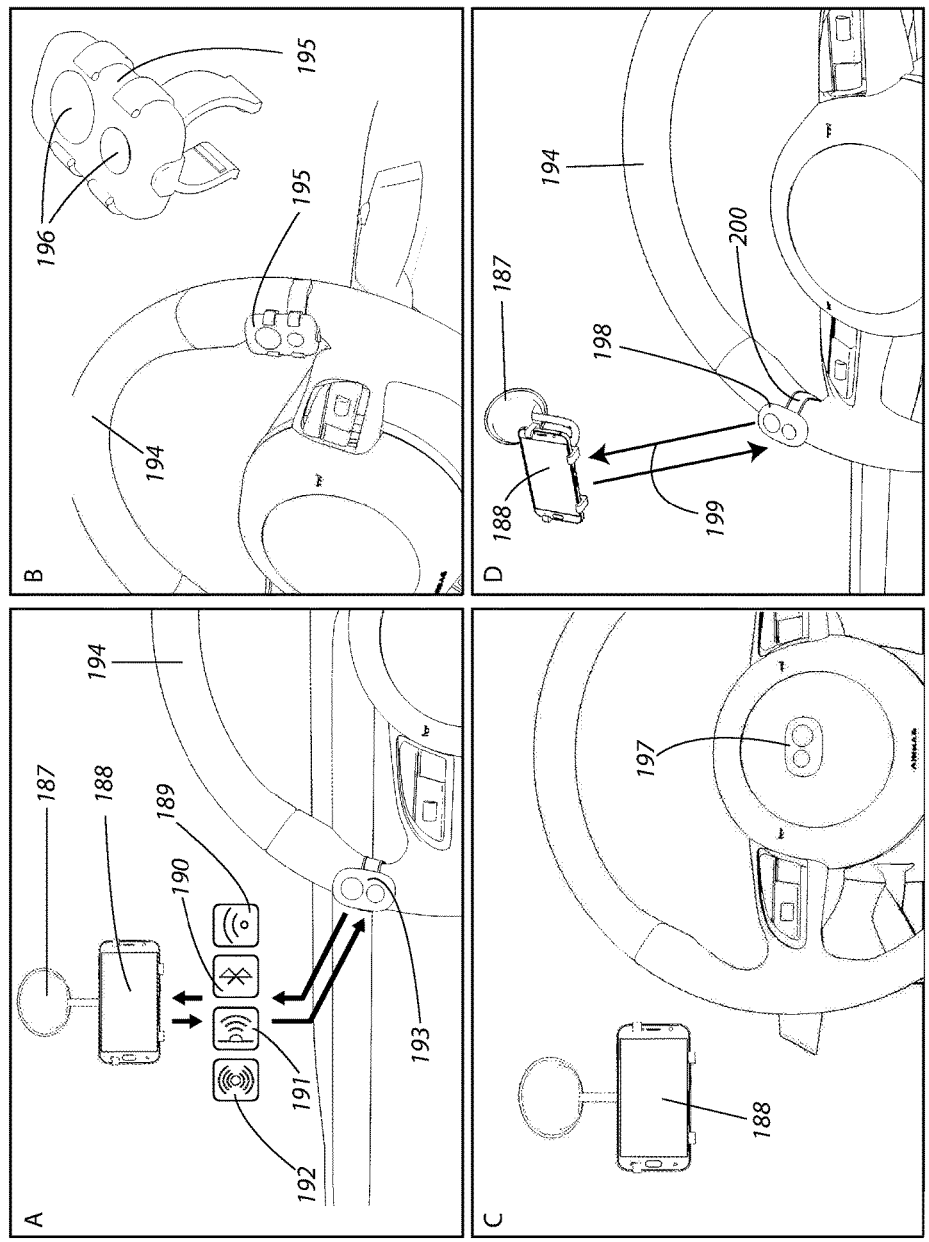

FIG. 12: Shows a remote clicker that records the gestures of a person through the push of a button or touch and transmits the trigger to the phone. Shows various locations of how it can be mounted FIG. 13: Shows the remote gesture recorder and means of attaching it to different objects or body parts.

Figure 14:
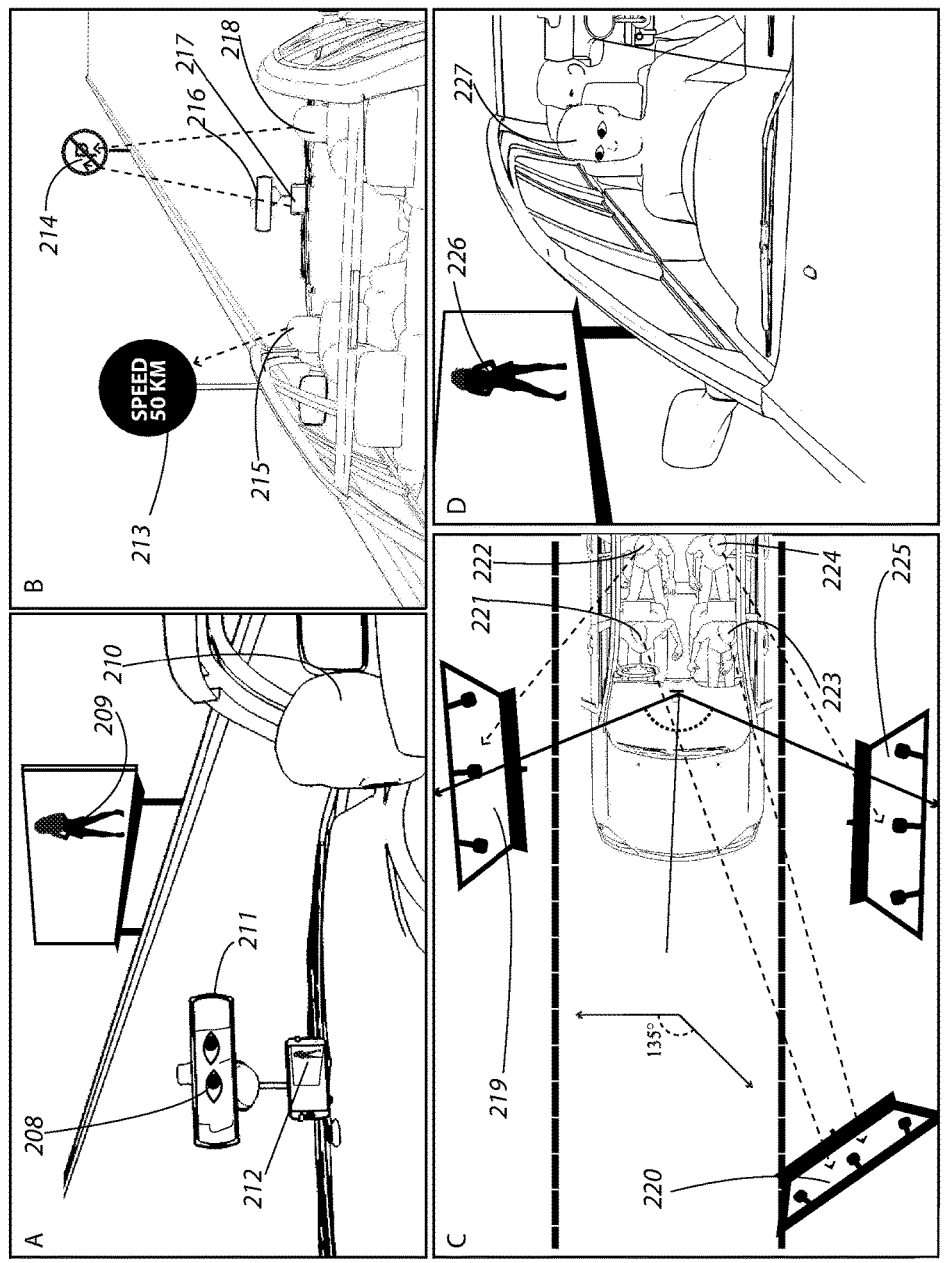

FIG. 14: Shows how the phone can capture the sight direction of people in the car and the location of the advertising boards, traffic signs and other displays on the road. The system determines if the visual markers are indeed watched by people, can rate their quality of placement or determine if they are distracting, causing accidents/bad driving FIG. 15: Shows the flow chart of a typical application and shows how a person can use an application to simultaneously act as a specialist and also help collect data for AI Training for automated Specialists.

Figure 16:
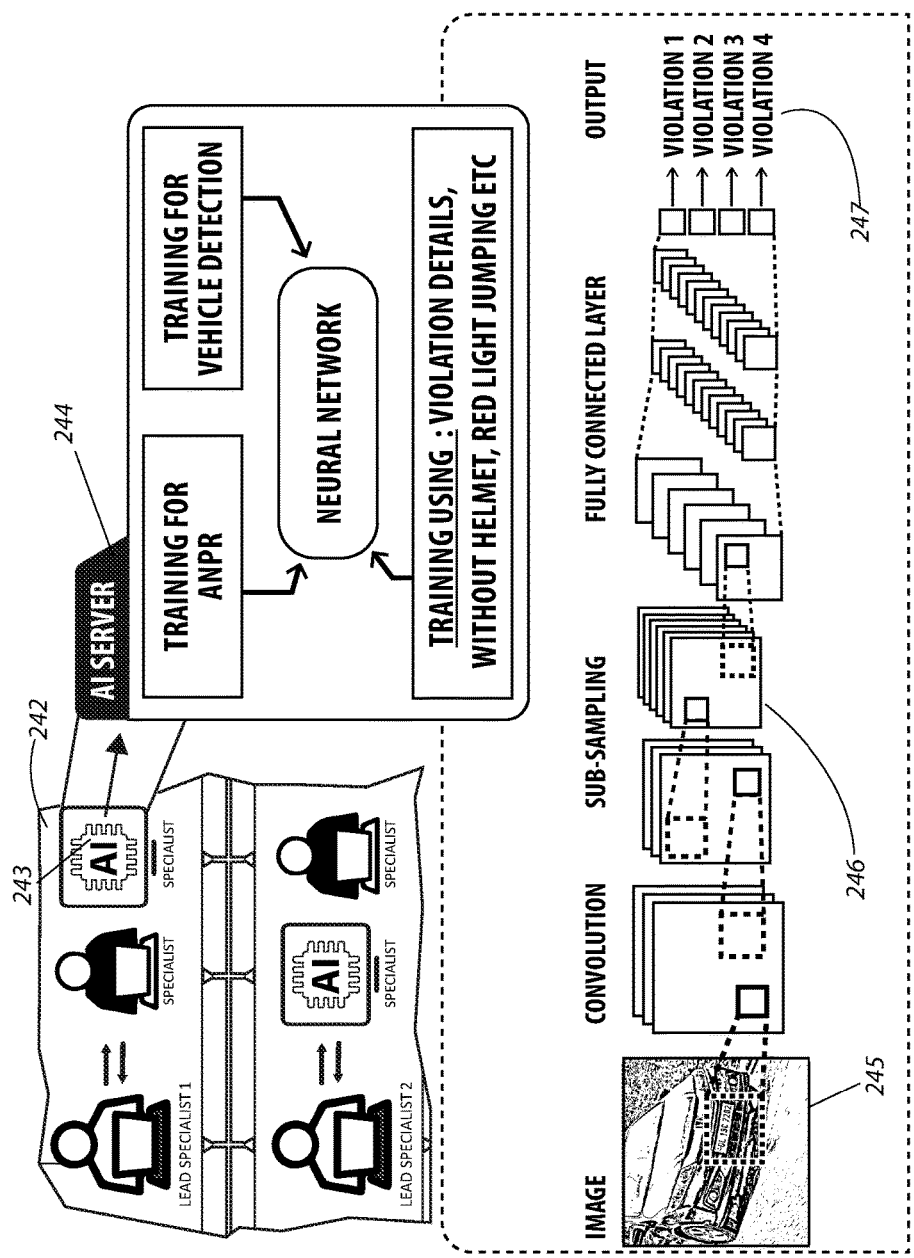
Figure 17:
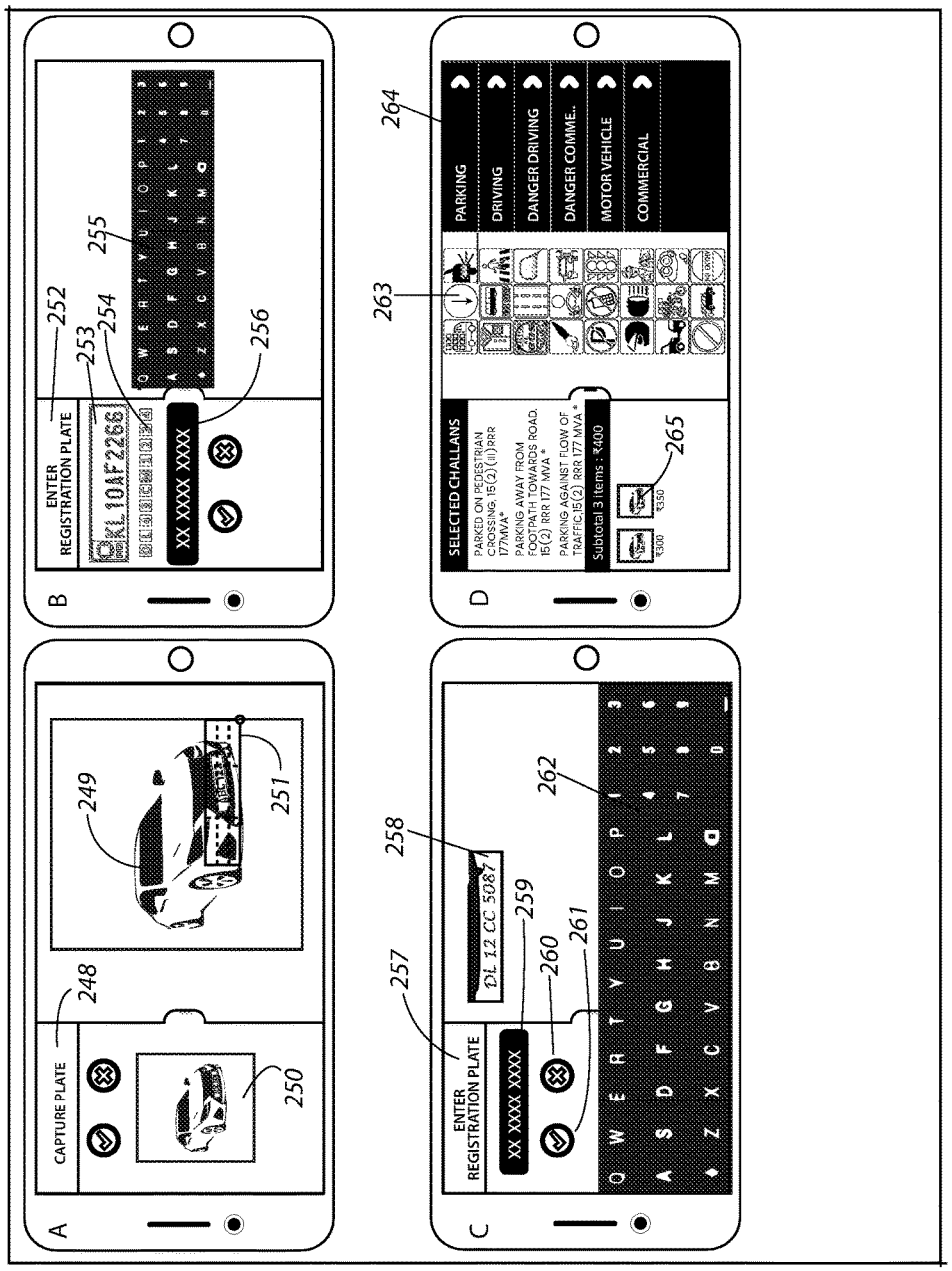

FIG. 16. is a Neural Network architecture showing how images are received with ROIs and then the outputs are trained using convolution and sub-sampling. Various trained data is then used for generating the various outputs for automated detection FIG. 17. shows how the specialist can do their job on a mobile phone as well (parent patent showed how they do it on a web portal).

Figure 18:
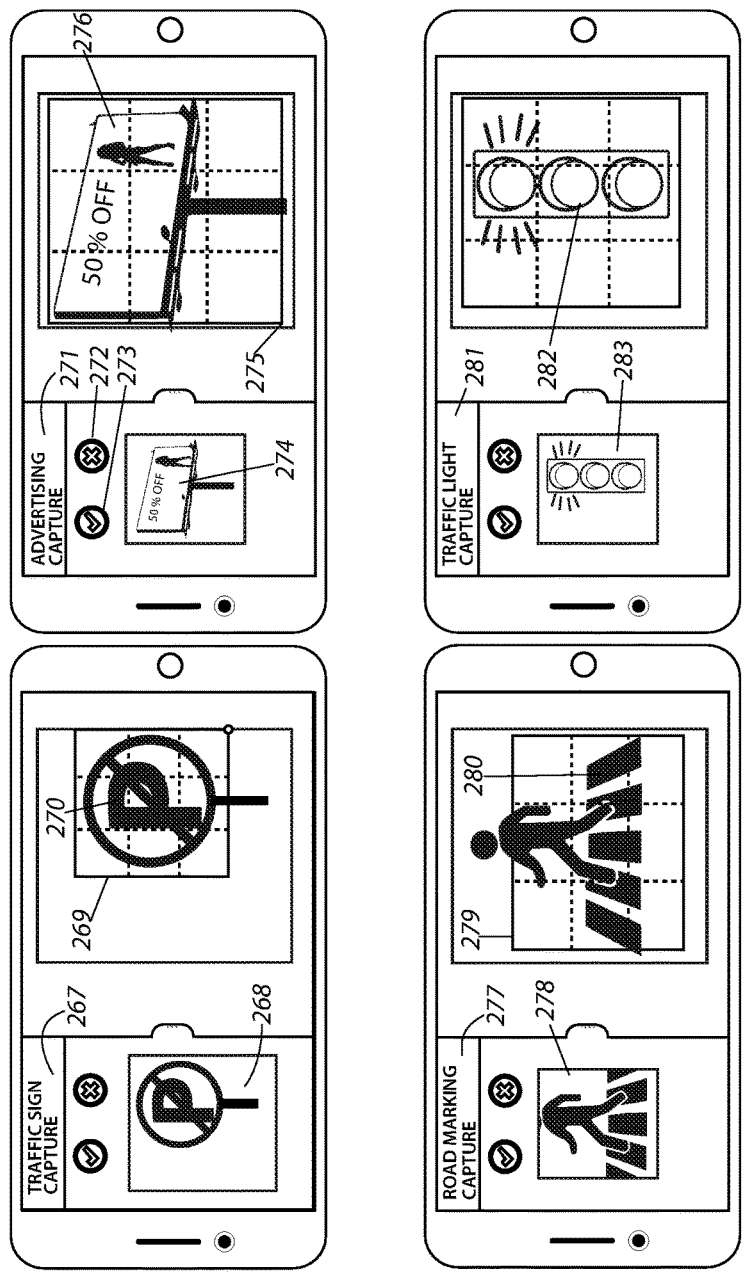

FIG. 18. Shows other objects of interest being categorized by specialists on their mobile or web devices and such is then sent to the AI server for training automated detection FIG. 19. Is taken from the parent patent wherein the on-demand, crowdsourced, stewardship system is shown with specialists, auditors and data collectors connected together through the cloud.

Figure 20:
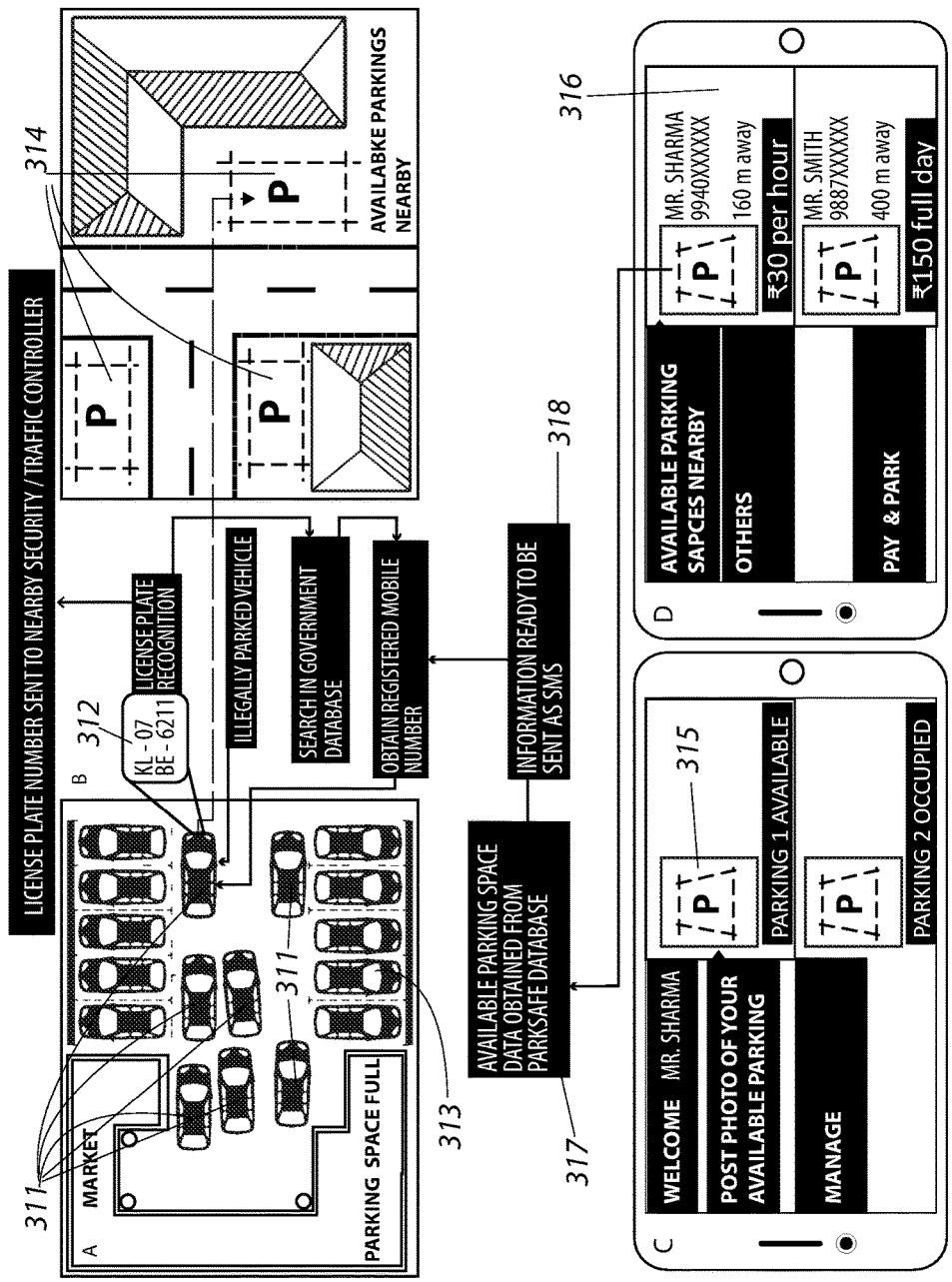

FIG. 20. Shows the parking allocation scheme for the PARKSAFE technology disclosed in this patent.

Figure 21:
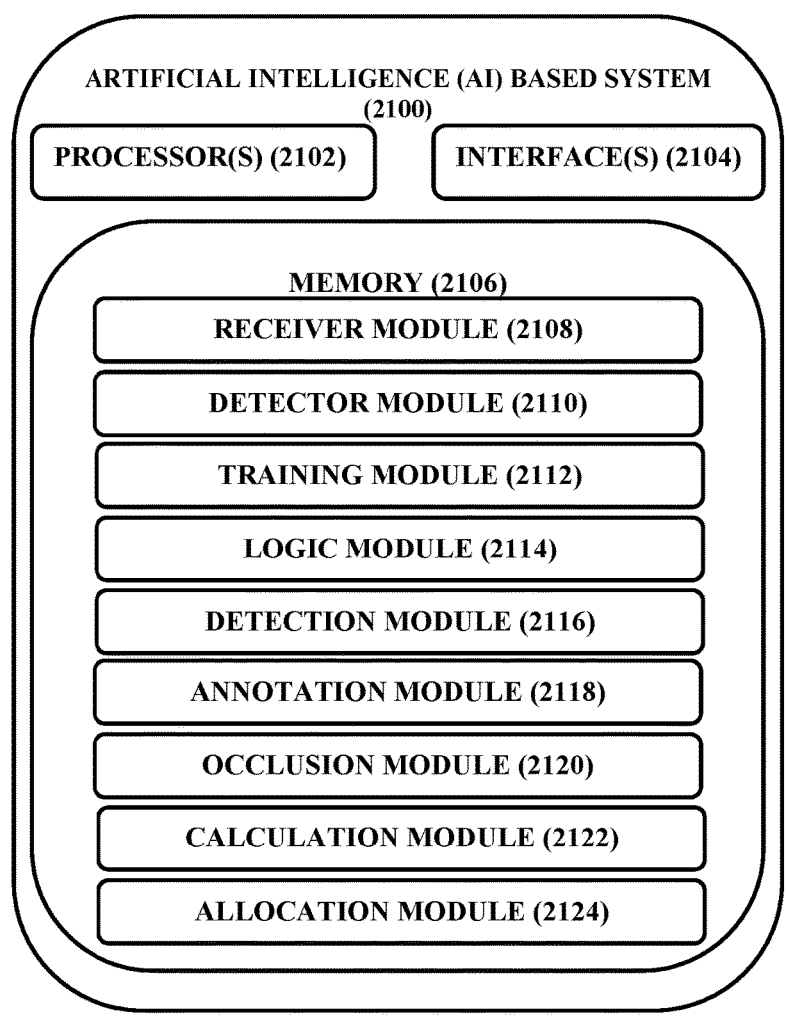

FIG. 21 a module diagram of artificial intelligence (AI) based system and its overall working, in accordance with an exemplary embodiment of the present disclosure.

DETAILED DESCRIPTION OF FIGURES

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art.

The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The diagrams are for illustration only, which thus is not a limitation of the present disclosure, and wherein:

FIG. 1. The illustrations herein show all the Motor Vehicle violations for Category 1 of the violation types. Category 1 violations are those violations which do not require any information about the surroundings of the vehicle. Violations of the sort are determined only through the inspection of the vehicle's state. (A) shows vehicle 1, 3 driving without its head light beams ON 3 at incoming cars. This is the lawful use of headlights at night, because otherwise it would impede the visibility of the incoming cars by the glare of head-lights at full beam. An artificial intelligence system composed of a CNN can ascertain the full beam condition against a non-full beam condition by training with enough sample sets, resulting in a binary format; 6 shows the correct use of Full beam. The $2^{nd}$ part of it would be to determine the license plate of the vehicle and then notifying the person of the said violation to teach them against doing it again. (B) The picture 7 shows a common occurrence in a lot of cities where owing to the inconsistencies of local transportation or inadequacy/availability, or simply due to impatience to wait for the next transport vehicle, some people board the bus and stand 8, 9 on the footboard of the bus, which is unlawful in those cities. This is vastly dangerous due to no protection to the people outside the bounding space of the vehicle. The violation in this case is the responsibility of the bus driver and the conductor of the bus, who need to regulate the boarding of the bus in case It's capacity is full. The determination of a footboard being full or empty can be trained using a CNN again. (C) similarly identifying the number of passengers in the vehicle shown and comparing it with vehicles carrying more people than lawful, would raise the violation again. (D) using some of the techniques for license plate detection systems or ALPR (Automatic License Plate Recognition) the text needs to be clearly visible and illuminated. However, on training data sets with and without illuminating lights, those vehicles driving in low light conditions need to have their license plates illuminated for identification purposes. CNN can train weights against plates illuminated and those not illuminated. (E) All vehicles are required to have their windshields fitted to avoid impeding the driving ability of the driver and it's passengers are also endangered by the debris on the road or elements in the air. (F) Partially or heavily tinted windows are also unlawful in many cities and hence the need to train CNNs to look for vehicles with normal or acceptable levels of tinting and those with higher than accepted level of tinting. (G) Numerous license plates are in use in some cities, some of them don't follow the lawful and conventional font. Some plates don't follow the lawful format of the text, while others completely ignore the license plate numbers using alternate or fancy alphanumeric. A CNN trained to recognize a standard font and format can detect a deviation in the style and flag the license plate. A combination of Tensor flow and Darknet/Yolo based systems can determine whether a plate is in the correct format and font. (H) in some cases violators believe they can get away by the use of "Applied for" or AF signs on their vehicles instead of the lawful license plate to avoid automated citations, such violation are easily detected using ALPR systems or CNNs and flagged for the authorities to stop the vehicle from driving further on the roads. (I) in cases such as with B, 2 wheelers and 3 wheelers are also not allowed to overload with goods and passengers, hence such can be trained with a CNN to recognize the deviation in luggage or passenger capacity FIG. 2: A. shows examples of side mirrors which need to be deployed open while driving. Absence of the same is a violation and can be picked up by training the Artificial Neural Networks (ANNs) to detect side mirrors on vehicles. B. Carrying more than 2 persons on a two seater vehicle is an offense again. This also causes hindrance to the driver similar to D. ANNs can detect the type of vehicle and the number of people traveling on the vehicle by identifying persons within the ROI of the vehicle. C. Shows the identification of the visibility of indicator lights 29, 30, 31 when the vehicle is changing lanes or breaking or taking a turn. Lack of such can be caught using ANNs by recognizing a broken light vs. an intact light. E. vehicles with loads extending outside the bounds of the vehicle are trained to be flagged as well by the ANN by recognizing the bounding 3D dimensions of the vehicle and all extrusions beyond the ROI are flagged to be a violation. G. carrying animals without sufficient safe room can again be detected by the ROI showing the animal in concern and the ROI of its surroundings and understanding the available space for the animal. ANNs can additionally count the total number of animals in the ROI can calculate the space of the ROI (vehicle container) then flag the vehicle if the space isn't enough. H. not wearing a seat belt is flagged is a seat belt is not recognized by the CNN/ANN. I. A goods vehicle is identified by the ANNs and animals are similarly identified and any overlap in the bounding boxes is flagged as a violation by the driver of the vehicle.

FIG. 3: A. without adequate lights 39, showing the license plates forces another violation trigger. B. instead of being offensive, some number plates are just generally in the wrong format, but not offensive. Wherein the size of the font of the angle of the font (italics etc.) or just the spacing between letter and number isn't standard. C. for transportation vehicles it is not authorized to carry more than 6 persons on the same vehicle. In such cases, the ANNs can count the number of people riding and the type of vehicle and flag the vehicle for violating the rule. D. driving by a type of person who is unable to properly sit on the vehicle is detected by the ANNs and flagged. E. for motorists on 2-wheel motor vehicles, wearing a helmet is mandatory; hence any deviation from the law can flag the ANN to cite the violation. F. smoke coming from the vehicle can be detected by the ANNs by creating a bounding box around the smoke and the bounding box of the vehicle ROI and an intersection of the two would confirm a violation. In case multiple vehicles are traveling together, then the detection can be in category 3, where in the multiple images would show the smoke belonging to one vehicle. G. Tires also not in good health or the wrong size, or driving on low air/gas would be detected by the ANNs when the vehicle comes to a stop. Deflated tyres can be pickup up while driving as well. H. Vehicles with only one head light would be picked up by the ANNs again by training them against vehicles with both headlights. I. Shows motorists using a mobile phone while driving which is a grave distraction and is illegal is mostly all cities. ANNs can detect conditions when a mobile phone is being operated by observing the location of the hands, the visuals of the mobile phone.

FIG. 4: A. Non-present wipers can be easily picked up by ANNs as well, similar to B for pollution creating vehicles; C. Safety devices are mandatory for motorcycles and scooters and identification of the missing components when trained against Proper vehicles can flag the ANN's citation of the same. D. Good carriers need to display their credentials and also various other markings indicating what they are carrying within as well. ANNs can read the said signage and make sure it's properly printed around the transport vehicles to comply with the local laws. E. Often trucks and goods carriers, due to their delays and/or intent to transport more than regulated in a single trip, may increase their carriage and introduce more goods and loads, thus increasing the overall height of the load, endangering other vehicles and breaching safety regulations. ANNs can be trained against dimensions of a compliant truck load and non-compliant truck load. Similarly F, where civilians and drivers may use their vehicle to carry goods in contravention of the laws. Passenger vehicles are not designed to carry goods and have to be embodied with out of scope fittings, etc. to ensure goods can be hosted, in contravention of passenger vehicle laws. Artificial Neural Networks can detect the same and cite the vehicle for misuse of the vehicle. Dangerous projection of goods G, is a gross offence that costs both life and damage to property in various situations; we can train the ANNs to detect vehicles which carry such protruding loads/rods etc. H. Many commercial vehicles are required to post their license plate and credentials on the left of the vehicle for identification to authorities, an ANN can detect whether such is visible or not through training. I, require goods vehicles to be fitted with the appropriate lights, especially when traveling in low light conditions to signal the approach and proximity of such vehicles to others. Missing one or more of the lights can be signaled as a non-compliance by having the ANNs train to detect the lights and consequently lack thereof.

FIG. 5: Vehicles are not allowed to drive without the proper reflectors for low light conditions A; vehicles are also not allowed to carry loads beyond their bounding dimensions B, D; vehicles are not allowed to use their tailboard to carry loads on the vehicles. All load should be within the body of an open trailer/truck and the tailboard needs to be closed (not open and suspended to allow more load to be fitted in) C. Carrying goods in public service vehicle such as auto-rikshaws, tempos, e-rikshaws etc. is strictly prohibited and is recognized by training with data showing the same. E.

FIG. 6: A. Transport vehicles or even non-transport vehicles carrying unsecured loads can be detected by the means of movement or displacement of the load wrf to the constraints of the body of the vehicle, C, Transport vehicles may not advertise without permission from the authorities. License plates need to conform to Transport and Non-Transport vehicles. F. Destination board should be illuminated for public carriers and can be picked up by ANNs. Similarly overloading vehicles with passengers or goods is a contravention of local laws in many cities G, H, I.; B, E again show the proper license plates for the vehicles.

FIG. 7: A indicates traffic violations when a driver of a vehicle is not driving in proper lane. B indicates traffic violation when the driver is driving in the center of the road creating inconvenience to other vehicles on the road and impedes overtaking etc. C indicates the traffic violation when the driver stops the vehicle 95 on pedestrian crossing 93 (zebra crossing). D indicates traffic violation when the driver 97, 98 is driving his vehicle on footpath (walking path for pedestrians) 96. E indicates traffic violation driver overtakes any vehicle passing through an opposite lane of a road and cross the double yellow line. F indicates traffic violation, when the driver stops in the opposite lane on any signal 102. G indicates traffic violation when the driver of the vehicle 105 does not stop even when the signal is red 106 (indicating stop for vehicle; a red-light). H-I indicate various driving signs and not following such signs leading to a traffic violation.

FIG. 8. A indicates traffic violations when a driver of a vehicle 109 is driving on a one way street/road. B indicates traffic violation when the driver drives at times or locations when it is unauthorized. C indicates the traffic violation when the driver parks vehicle on footpath (walking path for pedestrians). D indicates traffic violation when the driver is driving his vehicle in spite of seeing/having seen a stopping order by the authorities. E indicates traffic violation to cause to allow a motor vehicle to be left in a position likely to cause undue inconvenience to other road users. F indicates traffic violation when the driver leaves the vehicle in an unsafe position causing hindrance. G indicates traffic violation when the driver of a Bus stops without a Bus Stop. H indicates traffic violation when the driver parks the vehicle on pedestrian crossing (zebra crossing).

FIG. 9. A indicates traffic violations when a driver of a vehicle stops/parks his vehicle when no parking sign prohibits vehicles parked in that area. B indicates traffic violations when a vehicle 128 stops/parks in front of any gate 129. C indicates the traffic violation when the driver parks vehicle in such a manner that it may create inconvenience to the other vehicle for parking, i.e. not in any prescribed manner. D indicates traffic violation when the driver 131, 132, 133 parked causing obstruction. E indicates traffic violation when the vehicle is parked away from the footpath/sidewalk. F indicates traffic violation when the driver parks on a bridge or flyover, or overpass. G indicates traffic violation when the driver of the vehicle parks his vehicle in an authorized vehicle parking spot such as a Taxi Stand. H indicates traffic violation when the driver stops/parks the vehicle 142 at a traffic island 144. I indicate traffic violation when distance vehicle is parked within 15 meters of a bus stop.

FIG. 10. A indicates traffic violations when a driver of a does not allow other vehicles to overtake. B indicates traffic violations when a driver of a vehicle takes a turn without giving signal indication. C-E indicate the traffic violation when a vehicle is towed/pulled by another vehicle. F indicates traffic violation when the driver tries to overtake or drive his vehicle in a rough/rash/negligent driving fashion, causing others danger and inconvenience. G indicates traffic violation when the driver tries to drive his vehicle in dangerous or hasty driving manner, cutting through lanes and not driving in any orderly manner, breaking multiple rules of speed, overtaking etc. H indicates traffic violation when the driver of the vehicle exceeds the speed limit provided on a road. I illustrates a picture of obeying traffic rules, i.e., when a security official asks to stop your vehicle, stop it.

FIG. 11. A indicates racing on the roads. B overtaking perilously/dangerously. C overtaking from wrong side, indicates the traffic violation when a driver of a vehicle overtakes from left hand side. D indicates the traffic violation when a driver of a vehicle reverses his vehicle without care and attention. E indicates the traffic violation when a driver of a vehicle does not slow down at an intersection. F-H indicates indicate a picture of dis-obeying traffic rules, i.e., when a police officer asks to stop your vehicle, stop it. I indicate the correct way to approach another car on the freeway, it is a traffic violation when a driver of a vehicle flashes light when not required or dangerous.

FIG. 12 A shows the installation of a clicker or a gesture recorder 193 on the steering wheel 194 of a car which connects wirelessly (Ultrasonic 192, Infrared 191, Bluetooth 190, WiFi 189) through one or more communication standards; connects to the camera capture device or a mobile device 188 mounted 187 on the windshield or dashboard of the car. B shows an embodiment of the gesture capture device 195 having two buttons 196 mounted using a bracket on the steering wheel 194. C showing that the same gesture capture device is mounted on a different area of the steering wheel 197. Figure D shows the clasp/bracket that mounts the clicker or gesture capture device to the steering wheel.

Figure 13:
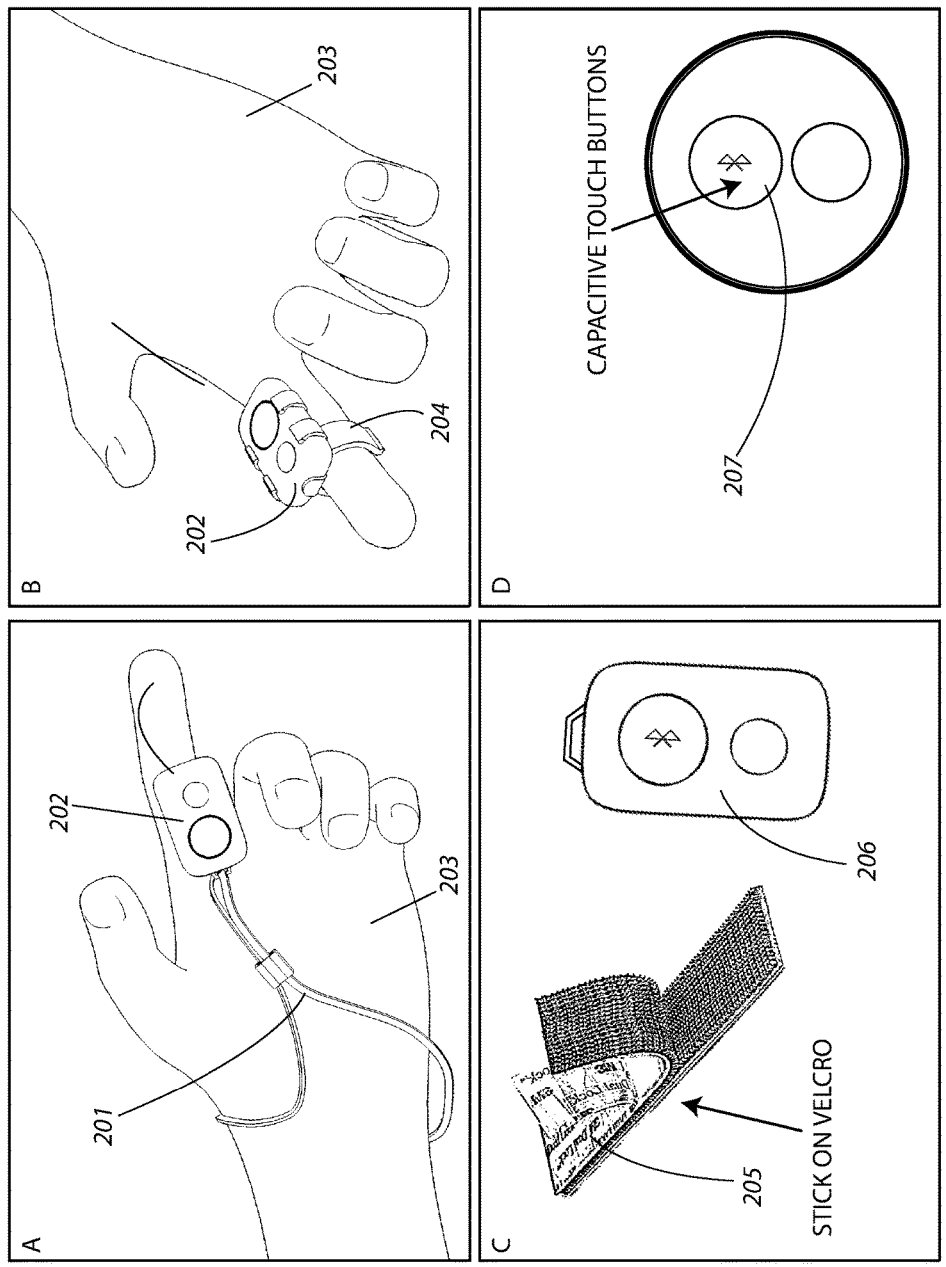

FIG. 13. A-D illustrate exemplary various mountings for the gesture control device or the clicker. As shown in FIG. 12 a dedicated device may be provided on a steering wheel of a vehicle which enables the driver to communicate with the other remote devices avoiding any disturbance/diversions from driving his vehicle and can drive and capture violation through the click of a button hands-free from the mobile camera device. The trigger initiated is delivered to the mobile camera device or the data collector device wirelessly. A shows the same gesture capture device on a string on a person's hand 201. B. with a finger clasp 204 on the person's hand 203. C. attached with VELCRO™ or other similar removable adhesives, D. Shows the gesture capture device could be capacitive touch in nature as well and be mounted using an electrostatic or magnetic attachment to a part of a person's body or to the vehicle directly.

FIG. 14. A the secondary camera on the phone (or any dual camera device) can capture the movement of head and eyes 208 of a person driving the vehicle and match them to that being captured from the primary camera of the mobile camera device 212. The location of the advertising boards, traffic signs and other displays on the road are also monitored to decide the placement of them. The AI system further determines if the visual markers are indeed watched by people, can rate their quality of placement or determine if they are distracting and causing accidents/bad driving. This will help in deciding the placement of visual markers and changing them to avoid further accidents. B. shows that different people are watching different sign boards at different times. C. Shows that the driver is watching the billboard 220 at 135 degrees and also the same is picked up by the camera 216. Hence a mapping of the general locations of the traffic sign boards or billboard and the corresponding gaze angle of the drivers and other passengers is recorded. This gives a good estimate/approximation of the direction the people look at, at a given GPS coordinate, driving at a given speed, time of the day, day of the week, month of the year etc. These metrics can help in adjusting the location or the type of advertising to maximize viewability or minimize distraction. Using the data gathered, various display signs and advertisements can be qualified for viewability and score them for varying pricings. Higher the score of the advertising/visible sign, the higher the cost for advertising at that location. The data can be averaged across all the vehicles traveling that route to get a good score across a larger dataset. Such data would be immensely useful for both corporate and government authorities to maximize on their investment and infrastructure.

Figure 15:
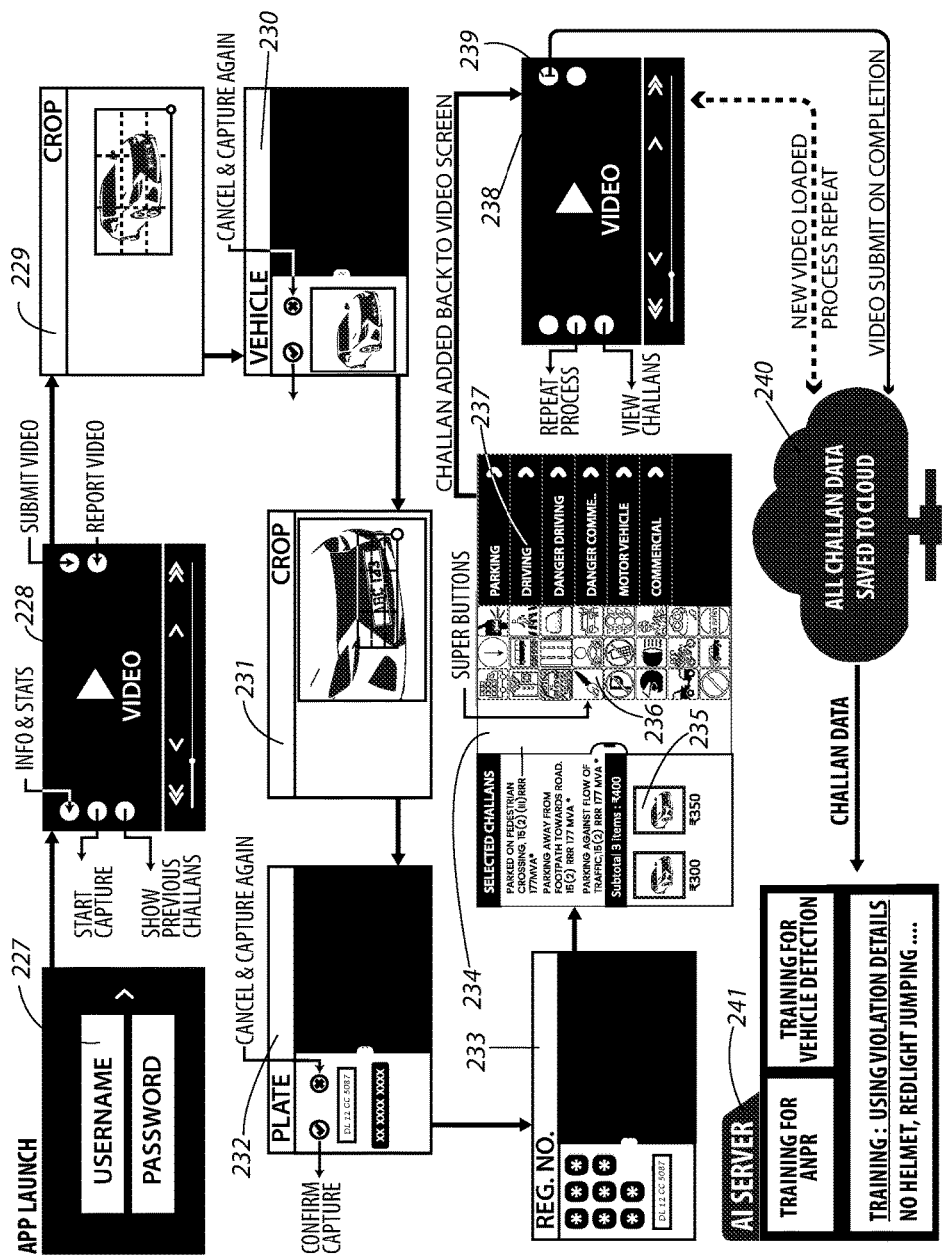
Figure 19:
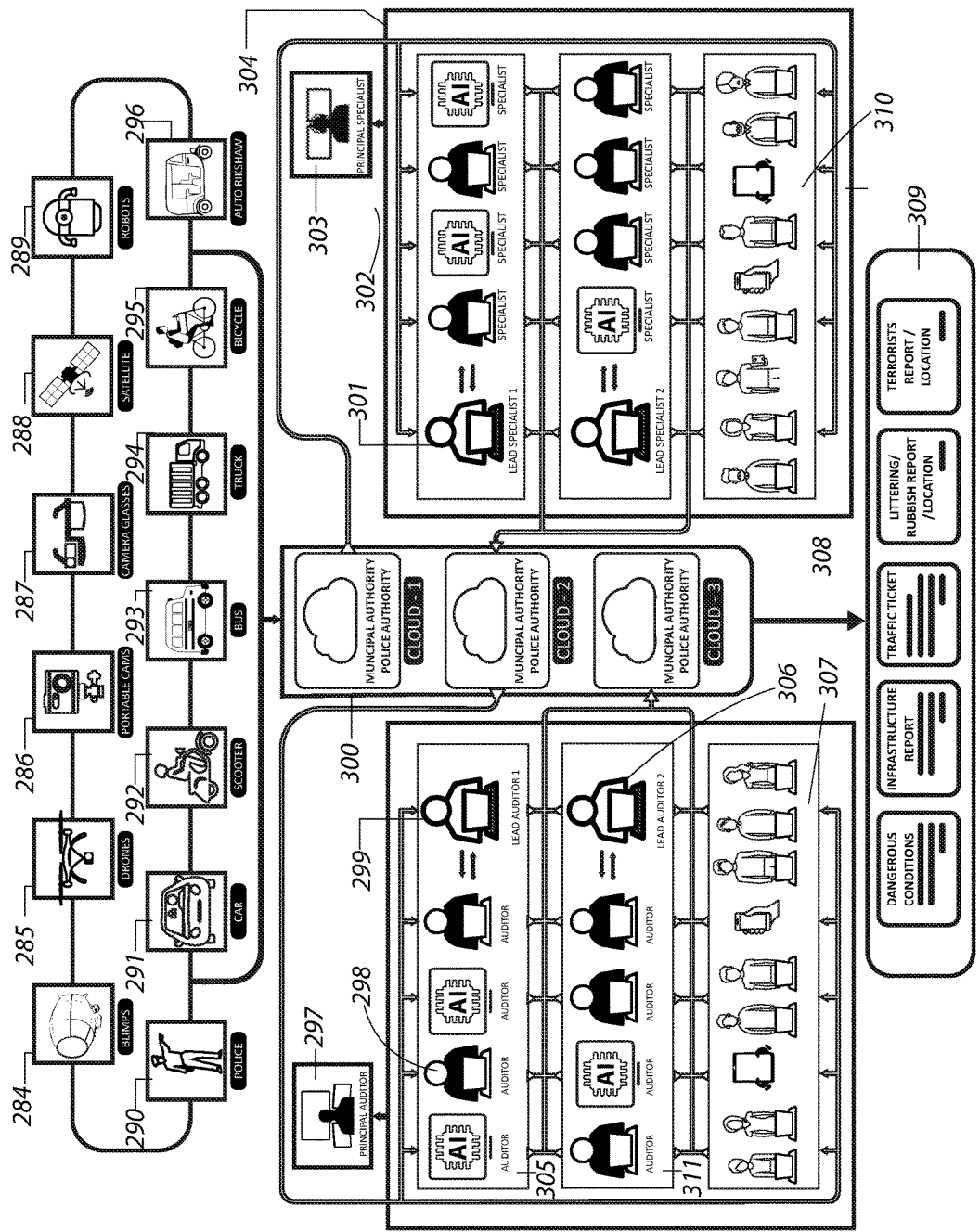

FIG. 15 illustrates an exemplary flow chart of a typical application and describes how a person can use a mobile application or display device to simultaneously act as a specialist and also help collect data for AI Training for automated Specialists in FIG. 16 and FIG. 19. A user can launch the application on mobile or any other computing handheld device etc. On submitting username and password 227, User is on the home screen 228 where the user can start as specialist and start capturing violations viewed inside videos collected by the data collectors; various options are available to the Specialist for the purpose. The next option 229 is used to crop and collect the picture of a vehicle, 232 determines by ANPR or manually 231 the license plate of the vehicle, upon approval, 230 it goes to the next step. However, if it's rejected, the user is taken to another screen to manually enter the license number 233. Any change in the user's entry compared to the AI/ANPR determined license plates, results in the system learning the Human Input and adds that to the long term learning of the AI engine for improving its performance in the future. The users then choose the type of the challans/violations 236, 237 and submit it to the server; the appropriate citation amount is listed 235 for the offences. The AI server/system then used the video for either training or restoring it to cloud for challan/citation recording. The AI server 241 (also expanded in FIG. 16) uses the human inputs and adds them to the pool of data points for the next iterations of training the weights on the neural networks. Then the specialist is presented a new video 228 and the cycle repeats.

FIG. 16 expands the Neural Network Specialists and auditors (AI server) describing how images are received with ROIs 245 and then the outputs are trained using convolution and sub-sampling 246 to ultimately determine one or more traffic violations 247. This is a general purpose Neural Network shown here. Various trained data is then used for generating the various outputs for automated detection. Once the training set for particular violation is complete, the AI Engine comes online with higher efficacy to act as the automated specialist. The cycle continues and continually automates the process of improving the AI engine (inside the AI Servers 244). Various SSDs can be used for the purpose, wherein a separate SSD us used for detecting characters in a license plate. FIGS. 17A-D illustrates how the specialist can do their job on a mobile phone or any other device having network connectivity. 250 is the manually captured image of a vehicle and the manual capture of license plate characters is shown in B. D, 263 shows various icons to represent various violation categories, which are selected to add to the violation list for the vehicles.

FIG. 18 illustrates various other objects of interest being categorized by specialists on their mobile or web devices 270, 276, 280, 282. Then these categorized objects of interest are sent to the AI server for training the AI Specialists for future automated detection.

FIG. 19. Shows the Roadway stewardship network as explained in the patent application Ser. No. 15/689,350 filed on Aug. 29, 2017, titled "On-demand Roadway Stewardship System previously invented by the author. The Roadway stewardship network shows the Data Collectors at the very top (Blimps 284, Drones 285, Portable Cams 286, Camera glasses 287, Satellites 288, Robots 289, Police 290, Cars 291, Scooters 292, Buses 293, Trucks 294, Bicycles 295, Auto Rikshaws 296, among others), who fed the videos or series of images to the Cloud network. The Specialists 304 review the data and look for objects of interest and then mark them for learning for the AI Specialists. The auditors review the marked-up data from the Cloud 2 and similarly approve or disapprove the data for future processing; in cases also editing the information to correct for any mistakes or missing information/data-points. Finally the outputs like citations, tickets, and other interested data sets are sent to the required agencies, authorities for further processing/executive decision making.

FIG. 20. Shows the PARKSAFE setup wherein the market place has many unauthorized parking of vehicles 311 taking place. The License plate 312 detectors B, capture the plates and inform the illegally parked vehicle owners via mobile phones or app notifications to fix their parking or get a citation. Additionally it shows available parking spaces to them 314. Drivers using their mobile app D 316 can see the available parking spaces and pay digitally to reserve them. C shows the Parking owners' interface where they can put their available parking spaces for rent 315.

Although the proposed system has been elaborated as above to include all the main modules, it is completely possible that actual implementations may include only a part of the proposed modules or a combination of those or a division of those into sub-modules in various combinations across multiple devices that can be operatively coupled with each other, including in the cloud. Further the modules can be configured in any sequence to achieve objectives elaborated. Also, it can be appreciated that proposed system can be configured in a computing device or across a plurality of computing devices operatively connected with each other, wherein the computing devices can be any of a computer, a laptop, a smartphone, an Internet enabled mobile device and the like. All such modifications and embodiments are completely within the scope of the present disclosure.

As used herein, and unless the context dictates otherwise, the term "coupled to" is intended to include both direct coupling (in which two elements that are coupled to each other or in contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

FIG. 21 a module diagram of artificial intelligence (AI) based system (2100) and its overall working, in accordance with an exemplary embodiment of the present disclosure. In one embodiment, the system may include one or more processor(s) (2102), an input/output (I/O) interface(s) (2104) and a memory (2106) for example, non-transitory storage device. The processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory. The I/O interface may include a variety of software and hardware interfaces, for example, a web interface, a graphical user interface, and the like. The I/O interface may allow system to interact with a user directly. The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server. The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules and data. The modules include routines, programs, and objects, components, and data structures etc., which perform particular tasks or implement particular abstract data types. In one implementation, the modules may include a receiver module (2108) to receive at least an object detection signal from one or more vision sensing systems, a detector module (2110) (alternatively or interchangeably referred to as "a detection module (2116)") to determine, for said objects, a region of interest (ROI) selected from the received images or a series of images or a video, a training module (2112) to receive the manually classified objects, obtained from the images or a series of images or a video and trains the Neural Network to improve the detector performance, a logic module (2114) to receive as input the detected objects of interest in a series of one or more images or videos and determines various actions or events of interest, an annotation module (2118) to read license plates detected by the detector module, an occlusion module (2120) to hide objects ROI or hides non-ROI information in the image or series of images or video, a calculation module (2122) to calculate a speed of said object utilizing object detection from the location of the said object in different frames of the video or series of images and the relative velocity of the vehicle installed with the said data collector, and an allocation module (2124) to allocate, one or more parking slot options, based on detection of said parking slots or by matching the host of a parking spot to the driver in need of a parking spot.

What is claimed is:

1. An artificial intelligence (AI) based system, part of a Roadway Stewardship Network, comprising:
   a non-transitory storage device having embodied therein one or more routines operable to detect objects in images using Artificial Neural Networks; and
   one or more processors coupled to the non-transitory storage device and operable to execute the one or more routines, wherein the one or more routines include:
   a receiver module, which when executed by the one or more processors, receives at least an object detection signal from one or more vision sensing systems, said object detection signal comprises or is accompanied by said images or series of images or a video associated with said objects;
   a detector module, which when executed by the one or more processors, determines, for said objects, a region of interest (ROI) selected from the received images or a series of images or a video;
   a training module which takes manually classified objects, obtained from the images or a series of images or a video and trains the Neural Network to improve the detector performance;
   a logic module which takes as input detected objects of interest in a series of one or more images or videos and determines various actions or events of interest, wherein the various actions or events of interest are a location, a position, a movement, and a category associated with said objects contained in the one or more images or videos based on comparison with accumulated training data.

2. The AI based system of claim 1, wherein said system is a module added to the Stewardship network to act as a Specialist or an Auditor or a Data Collector.

3. The AI based system of claim 1, wherein the detector module, also called a detection module, which when executed by the one or more processors, recognizes a region of interest in an image and classifies it as a vehicle or a part of a vehicle or a person or static/dynamic markings or a policeman.

4. The AI based system of claim 3, wherein the region of interest (ROI) is a vehicle or at least a part of the vehicle, in a series of images along with at least one another ROIs selected from of road signs, road markings, policeman, person, in the same series of images is sufficient to determine a violation of motor vehicle laws/guidelines.

5. The AI based system of claim 4, wherein the region of interest (ROI) is a vehicle or at least a part of the vehicle in a single image along with at least one another ROIs selected from road signs, road markings, policeman, person, in the same image is sufficient to determine a violation of motor vehicle laws/guidelines.

6. The AI based system of claim 5, wherein the region of interest (ROI) is at least a vehicle or at least a part of the vehicle or at least the driver of the vehicle in a single image is sufficient to determine a violation of motor vehicle laws/guidelines.

7. The AI based system of claim 6, wherein the AI based system further comprising an annotation module, which when executed by the one or more processors, configured to read license plates detected by the detector module.

8. The AI based system of claim 7, wherein the AI based system further comprising an occlusion module, which when executed by the one or more processors, hides objects ROI or hides non-ROI information in the image or series of images or video.

9. The AI based system of claim 3, wherein the detection module, which when executed by the one or more processors, is further configured to detect traffic violations based on the orientation and position of the vehicle or wherein the detection module further takes into account the position, orientation and location of other vehicles, relative to the vehicle of interest to determine traffic violations.

10. The AI based system of claim 9, wherein the AI based system further comprising: a calculation module, which when executed by the one or more processors, configured to calculate a speed of said object utilizing object detection from the location of the said object in different frames of the video or series of images and the relative velocity of the vehicle.

11. The AI based system of claim 10, wherein the AI based system further comprising: an allocation module, which when executed by the one or more processors, configured to allocate, one or more parking slot options, based on detection of said parking slots or by matching a host of a parking spot to the driver in need of a parking spot.

12. A method for detecting objects in images and videos using at least one or more artificial neural networks, the method comprising:
receiving, by a system, at least an object detection signal from one or more vision sensing systems, said object detection signal comprises said images associated with said objects;
determining by the system, a Region Of Interest (ROI) selected from the received images for said objects;
detecting by the system, a location, a position, a movement, and a category associated with said objects contained in the received images, using the artificial neural networks which are trained using accumulated training data, wherein the accumulated training data is obtained from specialists by having them perform among activities involving: identifying and annotating license plates of vehicles, identifying the 2D boundary around vehicles, identifying the types, make, model and other information about the vehicles, identifying various roadway violations committed by the vehicles, identifying roadway markings and signs, identifying and marking ROI for objects of interest.

13. The method of claim 12, wherein a data collector, configured to obtain the images and videos, has at least one sensor, visually capturing the direction(s) of gaze of person(s) inside the vehicle and at least one sensor capturing the direction(s) of visual marking(s) outside the vehicle; wherein when, the general direction(s) of gaze and visual marking(s) match, provides a general confirmation of the visual markings having been witnessed.

14. The method of claim 13, wherein the visual markings collected by the data collector are given a score based on number of persons who witness the markings, and wherein the scores are used to qualify the efficacy of placement of the visual marking(s) and the efficacy of the content(s) of the visual marking(s).

15. The method of claim 14, wherein a speed of the vehicle inside the ROI is measured from objects in images and videos collected by the data collector by checking the centroid or median or mean location of a license plates relative to the data collector.

16. The method of claim 15, wherein a Stewardship network, in which the specialists and auditors who review a video of series of images collected by the data collectors, earn points based on a count and accuracy of the detection of traffic violations, wherein, the collection of points emulates a game.

17. The method of claim 16, wherein the detection and identification of the system is supported by re-training the neural networks by adding the reviewed data to the accumulated training data.

* * * * *